United States Patent
Bookbinder et al.

(10) Patent No.: US 10,335,902 B2
(45) Date of Patent: Jul. 2, 2019

(54) METHOD AND SYSTEM FOR ARRESTING CRACK PROPAGATION

(71) Applicant: Corning Incorporated, Corning, NY (US)

(72) Inventors: Dana Craig Bookbinder, Corning, NY (US); Stephan Lvovich Logunov, Corning, NY (US); Albert Roth Nieber, Painted Post, NY (US); Garrett Andrew Piech, Corning, NY (US); Pushkar Tandon, Painted Post, NY (US); Sergio Tsuda, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 346 days.

(21) Appl. No.: 15/325,893

(22) PCT Filed: Jul. 14, 2015

(86) PCT No.: PCT/US2015/040241
§ 371 (c)(1),
(2) Date: Jan. 12, 2017

(87) PCT Pub. No.: WO2016/010943
PCT Pub. Date: Jan. 21, 2016

(65) Prior Publication Data
US 2017/0189999 A1    Jul. 6, 2017

Related U.S. Application Data

(60) Provisional application No. 62/024,059, filed on Jul. 14, 2014.

(51) Int. Cl.
*B23K 26/402* (2014.01)
*B23K 26/0622* (2014.01)
(Continued)

(52) U.S. Cl.
CPC ......... *B23K 26/402* (2013.01); *B23K 26/064* (2015.10); *B23K 26/0624* (2015.10);
(Continued)

(58) Field of Classification Search
CPC ........ B23K 26/40; B23K 26/06; B23K 26/08; B23K 26/35; B23K 26/57; B23K 26/07; C03B 33/07; C03B 33/02
(Continued)

(56) References Cited

U.S. PATENT DOCUMENTS 1,790,397 A    1/1931    Woods et al.
2,682,134 A    6/1954    Stookey
(Continued)

FOREIGN PATENT DOCUMENTS

CN    2388062 Y    7/2000
CN    1283409 C    11/2006
(Continued)

OTHER PUBLICATIONS

"What is the difference between Ra and RMS?"; Harrison Electropolishing LP; (http://www.harrisonep.com/electropolishingra.html), Accessed Aug. 8, 2016.
(Continued)

*Primary Examiner* — Samuel M Heinrich
(74) *Attorney, Agent, or Firm* — Smit Kapadia; Svetlana Z. Short

(57) ABSTRACT

A method of arresting propagation of an incident crack through a transparent material includes focusing pulsed laser beams into a laser beam focal line directed into the transparent material a series of locations corresponding to a predetermined pattern that is designed to arrest an incident crack that propagates through the transparent material, and generating, with the laser beam focal line (1460), an induced
(Continued)

absorption within the transparent material in order to produce a defect (1440) in the transparent material.

20 Claims, 14 Drawing Sheets

(51) Int. Cl.
| | | |
|---|---|---|
| *B23K 26/064* | (2014.01) | |
| *B23K 26/08* | (2014.01) | |
| *B23K 26/359* | (2014.01) | |
| *B23K 26/57* | (2014.01) | |
| *B23K 26/53* | (2014.01) | |
| *B23K 26/073* | (2006.01) | |
| *C03B 33/07* | (2006.01) | |
| *C03B 33/02* | (2006.01) | |
| *B23K 103/00* | (2006.01) | |

(52) U.S. Cl.
CPC .......... *B23K 26/0738* (2013.01); *B23K 26/08* (2013.01); *B23K 26/359* (2015.10); *B23K 26/53* (2015.10); *B23K 26/57* (2015.10); *C03B 33/0222* (2013.01); *C03B 33/076* (2013.01); *B23K 2103/50* (2018.08); *B23K 2103/54* (2018.08); *Y02P 40/57* (2015.11)

(58) Field of Classification Search
USPC ............. 219/121.72, 121.78, 121.83, 121.61
See application file for complete search history.

(56) References Cited

U.S. PATENT DOCUMENTS

| | | | |
|---|---|---|---|
| 2,749,794 | A | 6/1956 | O'Leary |
| 3,647,410 | A | 3/1972 | Heaton et al. |
| 3,695,497 | A | 10/1972 | Dear |
| 3,695,498 | A | 10/1972 | Dear |
| 3,729,302 | A | 4/1973 | Heaton |
| 3,775,084 | A | 11/1973 | Heaton |
| 4,226,607 | A | 10/1980 | Domken |
| 4,441,008 | A | 4/1984 | Chan |
| 4,546,231 | A | 10/1985 | Gresser et al. |
| 4,646,308 | A | 2/1987 | Kafka et al. |
| 4,764,930 | A | 8/1988 | Bille et al. |
| 4,891,054 | A | 1/1990 | Bricker et al. |
| 4,907,586 | A | 3/1990 | Bille et al. |
| 4,918,751 | A | 4/1990 | Pessot et al. |
| 4,929,065 | A | 5/1990 | Hagerty et al. |
| 5,035,918 | A | 7/1991 | Vyas |
| 5,040,182 | A | 8/1991 | Spinelli et al. |
| 5,104,210 | A | 4/1992 | Tokas |
| 5,108,857 | A | 4/1992 | Kitayama et al. |
| 5,112,722 | A | 5/1992 | Tsujino et al. |
| 5,114,834 | A | 5/1992 | Nachshon |
| 5,265,107 | A | 11/1993 | Delfyett |
| 5,400,350 | A | 3/1995 | Galvanauskas et al. |
| 5,434,875 | A | 7/1995 | Rieger et al. |
| 5,436,925 | A | 7/1995 | Lin et al. |
| 5,553,093 | A | 9/1996 | Ramaswamy et al. |
| 5,574,597 | A | 11/1996 | Kataoka et al. |
| 5,586,138 | A | 12/1996 | Yokayama |
| 5,656,186 | A | 8/1997 | Mourou et al. |
| 5,676,866 | A | 10/1997 | In Den Baumen et al. |
| 5,684,642 | A | 11/1997 | Zumoto et al. |
| 5,696,782 | A | 12/1997 | Harter et al. |
| 5,736,709 | A | 4/1998 | Neiheisel |
| 5,776,220 | A | 7/1998 | Allaire et al. |
| 6,016,223 | A | 1/2000 | Suzuki et al. |
| 6,016,324 | A | 1/2000 | Rieger et al. |
| 6,033,583 | A | 3/2000 | Musket et al. |
| 6,038,055 | A | 3/2000 | Hansch et al. |
| 6,055,829 | A | 5/2000 | Witzmann et al. |
| 6,078,599 | A | 6/2000 | Everage et al. |
| 6,156,030 | A | 12/2000 | Neev |
| 6,160,835 | A | 12/2000 | Kwon |
| 6,186,384 | B1 | 2/2001 | Sawada |
| 6,210,401 | B1 | 4/2001 | Lai |
| 6,256,328 | B1 | 7/2001 | Delfyett et al. |
| 6,259,151 | B1 | 7/2001 | Morrison |
| 6,259,512 | B1 | 7/2001 | Mizouchi |
| 6,272,156 | B1 | 8/2001 | Reed et al. |
| 6,301,932 | B1 | 10/2001 | Allen et al. |
| 6,322,958 | B1 | 11/2001 | Hayashi |
| 6,339,208 | B1 | 1/2002 | Rockstroh et al. |
| 6,373,565 | B1 | 4/2002 | Kafka et al. |
| 6,381,391 | B1 | 4/2002 | Islam et al. |
| 6,396,856 | B1 | 5/2002 | Sucha et al. |
| 6,407,360 | B1 | 6/2002 | Choo et al. |
| 6,438,996 | B1 | 8/2002 | Cuvelier |
| 6,445,491 | B2 | 9/2002 | Sucha et al. |
| 6,449,301 | B1 | 9/2002 | Wu et al. |
| 6,484,052 | B1 | 11/2002 | Visuri et al. |
| 6,489,589 | B1 | 12/2002 | Alexander |
| 6,501,578 | B1 | 12/2002 | Bernstein et al. |
| 6,552,301 | B2 | 4/2003 | Herman et al. |
| 6,573,026 | B1 | 6/2003 | Aitken et al. |
| 6,592,703 | B1 | 7/2003 | Habeck et al. |
| 6,635,849 | B1 | 10/2003 | Okawa et al. |
| 6,635,850 | B2 | 10/2003 | Amako et al. |
| 6,720,519 | B2 | 4/2004 | Liu et al. |
| 6,729,161 | B1 | 5/2004 | Miura et al. |
| 6,744,009 | B1 | 6/2004 | Xuan et al. |
| 6,787,732 | B1 | 9/2004 | Xuan et al. |
| 6,800,237 | B1 | 10/2004 | Yamamoto et al. |
| 6,800,831 | B1 | 10/2004 | Hoetzel |
| 6,958,094 | B2 | 10/2005 | Ohmi et al. |
| 6,992,026 | B2 | 1/2006 | Fukuyo et al. |
| 7,009,138 | B2 | 3/2006 | Amako et al. |
| 7,061,583 | B2 | 6/2006 | Mulkens et al. |
| 7,353,829 | B1 | 4/2008 | Wachter et al. |
| 7,402,773 | B2 | 7/2008 | Nomaru |
| 7,511,886 | B2 | 3/2009 | Schultz et al. |
| 7,535,634 | B1 | 5/2009 | Savchenkov et al. |
| 7,633,033 | B2 | 12/2009 | Thomas et al. |
| 7,642,483 | B2 | 1/2010 | You et al. |
| 7,649,153 | B2 | 1/2010 | Haight et al. |
| 7,726,532 | B2 | 6/2010 | Gonoe |
| 8,104,385 | B2 | 1/2012 | Hayashi et al. |
| 8,118,971 | B2 | 2/2012 | Hori et al. |
| 8,132,427 | B2 | 3/2012 | Brown et al. |
| 8,168,514 | B2 | 5/2012 | Garner et al. |
| 8,245,539 | B2 | 8/2012 | Lu et al. |
| 8,245,540 | B2 | 8/2012 | Abramov et al. |
| 8,269,138 | B2 | 9/2012 | Garner et al. |
| 8,283,595 | B2 | 10/2012 | Fukuyo et al. |
| 8,292,141 | B2 | 10/2012 | Cox et al. |
| 8,296,066 | B2 | 10/2012 | Zhao et al. |
| 8,327,666 | B2 | 12/2012 | Harvey et al. |
| 8,341,976 | B2 | 1/2013 | Dejneka et al. |
| 8,347,651 | B2 | 1/2013 | Abramov et al. |
| 8,358,888 | B2 | 1/2013 | Ramachandran |
| 8,444,906 | B2 | 5/2013 | Lee et al. |
| 8,448,471 | B2 | 5/2013 | Kumatani et al. |
| 8,518,280 | B2 | 8/2013 | Hsu et al. |
| 8,549,881 | B2 | 10/2013 | Brown et al. |
| 8,584,354 | B2 | 11/2013 | Cornejo et al. |
| 8,584,490 | B2 | 11/2013 | Garner et al. |
| 8,592,716 | B2 | 11/2013 | Abramov et al. |
| 8,604,380 | B2 | 12/2013 | Howerton et al. |
| 8,607,590 | B2 | 12/2013 | Glaesemann et al. |
| 8,616,024 | B2 | 12/2013 | Cornejo et al. |
| 8,635,887 | B2 | 1/2014 | Black et al. |
| 8,680,489 | B2 | 3/2014 | Martinez et al. |
| 8,685,838 | B2 | 4/2014 | Fukuyo et al. |
| 8,697,228 | B2 | 4/2014 | Carre et al. |
| 8,720,228 | B2 | 5/2014 | Li |
| 8,826,696 | B2 | 9/2014 | Brown et al. |
| 8,847,112 | B2 * | 9/2014 | Panarello ............. B23K 26/364 219/121.69 |
| 8,852,698 | B2 | 10/2014 | Fukumitsu |
| 8,887,529 | B2 | 11/2014 | Lu et al. |
| 8,916,798 | B2 | 12/2014 | Plüss et al. |
| 8,943,855 | B2 | 2/2015 | Gomez et al. |

(56) References Cited

U.S. PATENT DOCUMENTS

| | | |
|---|---|---|
| 8,951,889 B2 | 2/2015 | Ryu et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2003/0007773 A1 | 1/2003 | Kondo et al. |
| 2004/0021615 A1 | 11/2004 | Postupack et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0209898 A1* | 9/2005 | Asai .................. G06F 17/11 706/19 |
| 2005/0274702 A1 | 12/2005 | Deshi |
| 2005/0277270 A1 | 12/2005 | Yoshikawa et al. |
| 2006/0011593 A1 | 1/2006 | Fukuyo |
| 2006/0028728 A1 | 2/2006 | Li |
| 2006/0109874 A1 | 5/2006 | Shiozaki et al. |
| 2006/0127679 A1 | 6/2006 | Gulati et al. |
| 2006/0151450 A1 | 7/2006 | You et al. |
| 2006/0227440 A1 | 10/2006 | Glukstad |
| 2006/0266744 A1 | 11/2006 | Nomaru |
| 2006/0289410 A1 | 12/2006 | Morita et al. |
| 2007/0091977 A1 | 4/2007 | Sohn et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0079940 A1 | 4/2008 | Sezerman et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0320179 A1 | 12/2010 | Morita et al. |
| 2010/0326138 A1 | 12/2010 | Kumatani et al. |
| 2011/0049764 A1 | 3/2011 | Lee et al. |
| 2011/0049765 A1 | 3/2011 | Lei et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0139760 A1 | 6/2011 | Shah et al. |
| 2011/0183116 A1 | 7/2011 | Hung et al. |
| 2011/0210105 A1 | 9/2011 | Romashko et al. |
| 2011/0240611 A1 | 10/2011 | Sandstrom et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0205356 A1 | 8/2012 | Pluss |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fujii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0216573 A1 | 5/2013 | Hosseini et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Wiegel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | Desimone et al. |

(56) References Cited

U.S. PATENT DOCUMENTS

| | | | |
|---|---|---|---|
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0360991 A1 | 12/2015 | Grundmueller et al. |
| 2015/0367442 A1 | 12/2015 | Bovatsek et al. |
| 2016/0008927 A1 | 1/2016 | Grundmueller et al. |
| 2016/0009066 A1 | 1/2016 | Neiber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0279895 A1 | 9/2016 | Marjanovic et al. |
| 2016/0280580 A1 | 9/2016 | Bohme |
| 2016/0290791 A1 | 10/2016 | Buono et al. |
| 2017/0169847 A1 | 6/2017 | Tamaki |

FOREIGN PATENT DOCUMENTS

| | | |
|---|---|---|
| CN | 101386466 A | 3/2009 |
| CN | 101502914 A | 8/2009 |
| CN | 201357287 Y | 12/2009 |
| CN | 101637849 A | 2/2010 |
| CN | 201471092 U | 5/2010 |
| CN | 102060437 A | 5/2011 |
| CN | 102248302 A | 11/2011 |
| CN | 102343631 A | 2/2012 |
| CN | 102649199 A | 8/2012 |
| CN | 102672355 A | 9/2012 |
| CN | 102898014 A | 1/2013 |
| CN | 102916081 A | 2/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 10346027 A | 4/2014 |
| CN | 103746027 A | 4/2014 |
| CN | 203509350 U | 4/2014 |
| CN | 104344202 A | 2/2015 |
| DE | 2231330 A1 | 1/1974 |
| DE | 2231330 A1 | 10/1974 |
| DE | 10200635555 A1 | 1/2008 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 0270897 A1 | 6/1988 |
| EP | 270897 A1 | 2/1992 |
| EP | 609978 A1 | 8/1994 |
| EP | 0609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 A1 | 7/2014 |
| EP | 2781296 A1 | 9/2014 |
| EP | 2783784 A2 | 10/2014 |
| EP | 2859984 A2 | 4/2015 |
| FR | 298294 A1 | 10/2013 |
| FR | 2989294 A1 | 10/2013 |
| GB | 1242172 | 8/1971 |
| GB | 1242172 A | 8/1971 |
| GB | 2481190 B | 1/2015 |
| JP | 1179770 A | 7/1989 |
| JP | 6318756 | 11/1994 |
| JP | 6318756 A | 11/1994 |
| JP | 9106243 A | 4/1997 |
| JP | 09106243 A | 4/1997 |
| JP | 11197498 | 7/1999 |
| JP | 11269683 | 10/1999 |
| JP | 11269683 A | 10/1999 |
| JP | 11330597 | 11/1999 |
| JP | 11347758 | 12/1999 |
| JP | 11347758 A | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003062756 A | 3/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 2009172633 A | 8/2009 |
| JP | 2010017990 A | 1/2010 |
| JP | 2010046761 A | 3/2010 |
| JP | 04592855 B2 | 12/2010 |
| JP | 4592855 B2 | 12/2010 |
| JP | 2011049398 A | 3/2011 |
| JP | 4672689 B2 | 4/2011 |
| JP | 04672689 B2 | 4/2011 |
| JP | 2011517299 A | 6/2011 |
| JP | 04880820 B2 | 2/2012 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 05274085 B2 | 8/2013 |
| JP | 5274085 B2 | 8/2013 |
| JP | 05300544 B2 | 9/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 2009057161 A | 6/2009 |

(56) References Cited

FOREIGN PATENT DOCUMENTS

| | | |
|---|---|---|
| KR | 1020621 | 3/2011 |
| KR | 1020621 B1 | 3/2011 |
| KR | 2012015366 A | 2/2012 |
| KR | 1120471 | 3/2012 |
| KR | 2012074508 | 7/2012 |
| KR | 2012074508 A | 7/2012 |
| KR | 2013031380 | 3/2013 |
| KR | 2013031380 A | 3/2013 |
| KR | 1269474 | 5/2013 |
| KR | 1269474 B1 | 5/2013 |
| KR | 2013124646 | 11/2013 |
| KR | 2013124646 A | 11/2013 |
| KR | 1344368 | 12/2013 |
| KR | 1344368 B1 | 12/2013 |
| KR | 2014022980 | 2/2014 |
| KR | 2014022980 A | 2/2014 |
| KR | 2014022981 | 2/2014 |
| KR | 2014022981 A | 2/2014 |
| KR | 2014064220 | 5/2014 |
| KR | 1020140064220 A | 5/2014 |
| TW | 201139025 A | 11/2011 |
| TW | 201226345 | 7/2012 |
| TW | 201226345 A | 7/2012 |
| WO | 1999029243 | 6/1999 |
| WO | 1999029243 A1 | 6/1999 |
| WO | 1999063900 | 12/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008049389 A1 | 5/2008 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012166753 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |
| WO | 2015095088 A1 | 6/2015 |
| WO | 2015095090 A1 | 6/2015 |
| WO | 2015095146 A1 | 6/2015 |
| WO | 2015127583 A1 | 9/2015 |
| WO | 2016005455 A1 | 1/2016 |
| WO | 2016010954 A2 | 1/2016 |
| WO | 2016154284 A1 | 9/2016 |

OTHER PUBLICATIONS

"EagleEtch" Product Brochure, EuropeTec USA Inc., pp. 1-8, Aug. 1, 2014.
"Pharos High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug. 2011.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
Abramov et al., "Laser separation of chemically strengthened glass"; Physics Procedia 5 (2010) 285-290, Elsevier.; doi: 10.1016/j.phpro.2010.08.054.
Ahmed et al. "Display glass cutting by femtosecond laser induced single shot periodic void array" Applied Physics A: Materials Science and Proccessing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
Bagchi et al. "Fast ion beams from intense, femtosecond laser irradiated nanostructured surfaces" Applied Physics B 88 (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) Feb. 11, 2007.
Bhuyan et al. "Ultrafast Bessel beams for high aspect ratio taper free micromachining of glass" Proc. of SPIE vol. 7728 77281V-1.
Bhuyan et al., "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, Aug. 11, 2002 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Case Design Guidelines for Apple Devices Release R5 (https://web.archive.org/web/20131006050442/https://developer.apple.com/resources/cases/Case-Design-Guidelines.pdf ; archived on Oct. 6, 2013).
Chiao et al. 9. "Self-trapping of optical beams," Phys. Rev. Lett, vol. 13, Num. 15, p. 479 (1964).
Corning Inc., "Corning® 1737 AM LCD Glass Substrates Material Information", issued Aug. 2002.
Corning Inc., "Corning® Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
Dong et al. "On-axis irradiance distribution of axicons illuminated by spherical wave", Optics & Laser Technology 39 (2007) 1258-1261.
Duocastella et al. "Bessel and annular beams for material processing", Laser Photonics Rev. 6, 607-621, 2012.
Durnin. "Exact solutions for nondiffracting beams I. The scaler theory" J. Opt. Soc. Am. A. 4(4) pp. 651-654.
Eaton et al. "Heat accumulation effects in femtosecond laser written waveguides with variable repetition rates", Opt. Exp. 5280, vol. 14, No. 23, Jun. 2006.
Gattass et al. "Micromachining of bulk glass with bursts of femtosecond laser pulses at variable repetition rates" Opt. Exp. 5280, vol. 14, No. 23, Jun. 2006.

(56) References Cited

OTHER PUBLICATIONS

Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Gori et al. "Analytical derivation of the optimum triplicator" Optics Communications 157 (1998) pp. 13-16.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Honda et al. "A Novel Polymer Film that Controls Light Transmission", Progress in Pacific Polymer Science 3, 159-169 (1994).
http://www.gtat.com/Collateral/Documents/English-US/Sapphire/12-21-12_GT_TouchScreen_V3_web.pdf.
Hu et al. "5-axis laser cutting interference detection and correction based on STL model" (2009) Zhongguo Jiguang/Chinese Journal of Lasers, 36 (12), pp. 3313-3317.
Huang et al., "Laser etching of glass substrates by 1064 nm laser irradiation", Applied Physics, Oct. 2008, vol. 93, Issue 1, pp. 159-162.
Juodkazis S. et al. Laser induced microexplosion confined in the bulk of a sapphire crystal: evidence of multimegabar pressures., Phys. Rev. Lett. 96, 166101, 2006.
Karlsson et al. "The technology of chemical glass strengthening—a review" Glass Technol: Eur. J. Glass Sci. Technol. A (2010) 51 (2) pp. 41-54.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Kruger et al., "Femtosecond-pulse visible laser processing of transparent materials"; Applied Surface Science 96-98 (1996) 430-438.
Kruger et al., "Laser micromachining of barium aluminium borosilicate glass with pluse durations between 20 fs and 3 ps"; Applied Surface Science 127-129 (1998) 892-898.
Kruger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Levy et al. "Design, fabrication, and characterization of circular Dammann gratings based on grayscale lithography," Opt. Lett vol. 35, No. 6, p. 880-882 (2010).
Liu X et al. "laser ablation and micromachining with ultrashort laser pulses", IEEE J. Quantum Electronics, 22, 1706-1716, 1997.
Maeda et al. "Optical performance of angle-dependent light-control glass", Proc. SPIE 1536, Optical Materials Technology for Energy Efficiency and Solar Energy Conversion X, 138 (Dec. 1, 1991).
Mbise et al. "Angular selective window coatings: theory and experiments" J. Phys. D: Appl. Phys. 30 2103 (1997).
McGloin et al."Bessel beams: diffraction in a new light" Contemporary Physics, vol. 46 No. 1 (2005) pp. 15-28.
Merola et al. "Characterization of Bessel beams generated by polymeric microaxicons" Meas. Sci. Technol. 23 (2012) 10 pgs.
Mirkhalaf, M. et al., Overcoming the brittleness of glass through bio-inspiration and micro-achitecture, Nature Communications, 5:3166/ncomm4166(2014).
Perry et al., "Ultrashort-pulse laser machining of dielectric materials"; Journal of Applied Physics, vol. 85, No. 9, May 1, 1999, American Institute of Physics, pp. 6803-6810.
Perry et al., "Ultrashort-pulse laser machining"; UCRL-ID-132159, Sep. 1998, pp. 1-38.

Perry et al., "Ultrashort-pulse laser machining"; UCRL-JC-132159 Rev 1., Jan. 22, 1999, pp. 1-24.
Polynkin et al., "Extended filamentation with temporally chirped femtosecond Bessel-Gauss beams in air"; Optics Express, vol. 17, No. 2, Jan. 19, 2009, OSA, pp. 575-584.
Romero et al. "Theory of optimal beam splitting by phase gratings. II. Square and hexagonal gratings" J. Opt. Soc. Am. A/vol. 24 No. 8 (2007) pp. 2296-2312.
Salleo A et al., Machining of transparent materials using IR and UV nanosecond laser pulses, Appl. Physics A 71, 601-608, 2000.
Serafetinides et al., "Polymer ablation by ultra-short pulsed lasers" Proceedings of SPIE vol. 3885 (2000) http://proceedings.spiedigitallibrary.org/.
Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometric optics-based design of laser beam shapers",Opt. Eng. 42(11), 3123-3138 (2003). doi:10.1117/1.1617311.
Stoian et al. "Spatial and temporal laser pulse design for material processing on ultrafast scales" Applied Physics A (2014) 114, p. 119-127.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Thiele, "Relation between catalytic activity and size of particle" Industrial and Egineering Chemistry, vol. 31 No. 7, pp. 916-920.
Toytman et al. "Optical breakdown in transparent media with adjustable axial length and location", Optics Express vol. 18 No. 24, 24688-24698 (2010).
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Velpula et al.. "Ultrafast imaging of free carriers: controlled excitation with chirped ultrafast laser Bessel beams", Proc. of SPIE vol. 8967 896711-1 (2014).
Wang et al, "Investigation on CO2 laser irradiation inducing glass strip peeling for microchannel formation", Biomicrofluidics 6, 012820 (2012).
Wu et al. "Optimal orientation of the cutting head for enhancing smoothness movement in three-dimensional laser cutting" (2013) Zhongguo Jiguang/Chinese Journal of Lasers, 40 (1), art. No. 0103005.
Xu et al. "Optimization of 3D laser cutting head orientation based on the minimum energy consumption" (2014) International Journal of Advanced Manufacturing Technology, 74 (9-12), pp. 1283-1291.
Yan et al. "Fiber structure to convert a Gaussian beam to higher-order optical orbital angular momentum modes" Optics Letters vol. 37 No. 16 (2012) pp. 3294-3296.
Yoshino et al., "Micromachining with a high repetition rate femtosecond fiber laser"; JLMN-Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
Arimoto, R. et al.; Imaging properties of axicon in a scanning optical system; Applied Optics; Nov. 1, 1991; pp. 6653-6657; vol. 31, No. 31; Optical Society of America.
Betriebsanleitung; TruMicro 5000; Aug. 2011; pp. 1-4.
Bhuyan, M. et al.; High aspect ratio nanochannel machining using single shot femtosecond Bessel beams; Applied Physics Letters; Aug. 23, 2010; pp. 081102-1-081102-3; vol. 97.
Bhuyan, M. et al.; High aspect ratio taper-free microchannel fabrication using femtosecond Bessel beams; Optics Express; Jan. 18, 2010; pp. 566-574; vol. 18, No. 2; Optical Society of America.

(56) References Cited

OTHER PUBLICATIONS

Cubeddu, R. et al.; A compact time-resolved reflectance system for dual-wavelength multichannel assessment of tissue absorption and scattering; SPIE Conference on Optical Tomography and Spectroscopy of Tissue III; San Jose, California; Jan. 1999; pp. 450-455; vol. 3597; SPIE.
Cubeddu, R. et al.; Compact tissue oximeter based on dual-wavelength multichannel time-resolved reflectance; Applied Optics; Jun. 1, 1999; pp. 3670-3680; vol. 38, No. 16; Optical Society of America.
Ding, Z. et al.; High-resolution optical coherence tomography over a large depth range with an axicon lens; Optics Letters; Feb. 15, 2002; pp. 243-245; vol. 27, No. 4; Optical Society of America.
EagleEtch; TheAnti-glare Glass for Technical Display Applications; Glass and Polymer Technologies; pp. 1-8; EuropTec USA Inc.
Girkin, J. et al.; Macroscopic multiphoton biomedical imaging using semiconductor saturable Bragg reflector modelocked Lasers; SPIE Conference on Commercial and Biomedical Applications of Ultrafast Lasers; San Jose, California; Jan. 1999; pp. 92-98; vol. 3616; SPIE.
Glezer, E. et al.; Ultrafast-laser driven micro-explosions in transparent materials; Applied Physics Letters; 1997; pp. 882-884, vol. 71.
Golub, I.; Fresnel axicon; Optics Letters; Jun. 15, 2006; pp. 1890-1892;. vol. 31, No. 12; Optical Society of America.
Herman, P. et al.; Laser micromachining of 'transparent' fused silica with 1-ps pulses and pulse trains; SPIE Conference on Commercial and Biomedical Applications of Ultrafast Lasers; San Jose, California; Jan. 1999; pp. 148-155; vol. 3616; SPIE.
Kosareva, O. et al.; Formation of extended plasma channels in a condensed medium upon axicon focusing of a femtosecond laser pulse; Quantum Electronics; 2005; pp. 1013-1014; vol. 35, No. 11; Kvantovaya Elektronika and Turpion Ltd.
Kruger, J. et al.; Femtosecond-pulse visible laser processing of transparent materials; Applied Surface Science; 1996; pp. 430-438; Elsevier B.V.
Kruger, J. et al.; Laser micromachining of barium aluminium borosilicate glass with pulse durations between 20 fs and 3 ps; Applied Surface Science; 1998; pp. 892-898; Elsevier B.V.
Kruger, J. et al.; Structuring of dielectric and metallic materials with ultrashort laser pulses between 20 fs and 3 ps; SPIE Proceedings; San Jose, California; Feb. 8, 1997; pp. 40-47 vol. 2991; SPIE.
Lapczyna, M. et al.; Ultra high repetition rate (133 MHz) laser ablation of aluminum with 1.2-ps pulses; Applied Physics A Materials Science & Processing; Dec. 28, 1999; pp. S883-S886; vol. 69 (Suppl.) Springer-Verlag.
Perry, M. et al.; Ultrashort-Pulse Laser Machining; Lawrence Livermore National Laboratory; Sep. 1998; pp. 1-30.
Perry, M. et al.; Ultrashort-Pulse Laser Machining; International Congress on Applications of Lasers and Electro-Optics; Orlando, Florida; Nov. 16-19, 1998; pp. 1-24.
Perry, M. et al.; Ultrashort-pulse laser machining of dielectric materials; Journal of Applied Physics; May 1, 1999; pp. 6803-6810; vol. 85, No. 9; American Institute of Physics.
Pharos High-power Femtosecond Laser System specification; Light Conversion; 2011; pp. 1-2.
Polynkin, P. et al.; Extended filamentation with temporally chirped femtosecond Bessel-Gauss beams in air; Optics Express; Jan. 19, 2009; pp. 575-584; vol. 17, No. 2; Optical Society of America.
Serafetinides, A. et al.; Ultra-short pulsed laser ablation of polymers; Applied Surface Science; 2011; pp. 42-56; vol. 180; Elsevier Science B.V.
Sundaram, S. et al.; Inducing and probing non-thermal transitions in semiconductors using femtosecond laser pulses; Nature Materials; Dec. 2002; pp. 217-224; vol. 1; Nature Publishing Group.
Vanagas, E. et al.; Glass cutting by femtosecond pulsed irradiation; Journal of Micro/Nanolithography, MEMS, and MOEMS; Mar. 31, 2004; pp. 1-18; vol. 3, Issue 2; SPIE.

Varel, H. et al.; Micromachining of quartz with ultrashort laser pulses; Applied Physics A Materials Science & Processing; 1997; pp. 367-373; vol. 65.
Yoshino, F. et al.; Micromachining with a High Repetition Rate Femtosecond Fiber Laser; JLMN-Journal of Laser Micro/Nanoengineering; 2008; pp. 157-162; vol. 3, No. 3.
Zeng, D. et al.; Characteristic analysis of refractive axicon system for optical trepanning; Optical Engineering; Sep. 2006; pp. 094302-1-094302-10; vol. 45, No. 9.
Zhang, G. et al.; Design of diffractive-phase axicon illuminated by a Gaussian-profile beam; Acta Physica Sinica; May 1996; pp. 354-364; vol. 5, No. 5; Chin. Phys. Soc.
Kerr. "Filamentary tracks formed in transparent optical glass by laser beam self-focusing. II. Theoretical Analysis" Physical Review A. 4(3) 1971, pp. 1196-1218.
Abakians, H. et al.; Evaporative Cutting of a Semitransparent Body With a Moving CW Laser; Journal of Heat Transfer; Nov. 1988; pp. 924-930; vol. 110; ASME.
Ahmed, F. et al.; Display glass cutting by femtosecond laser induced single shot periodic void array; Applied Physics A Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.
Bhuyan, M.K. et al.; Femtosecond non-diffracting Bessel beams and controlled nanoscale ablation; ResearchGate Conference Paper; Sep. 2011; pp. 1-4.
Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.
Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Design Guidelines for Apple Devices; Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning Eagle AMLCD Glass Substrates Material Information; Apr. 2005; pp. MIE 201-1-MIE 201-3; Corning Incorporated.
Corning 1737 AMLCD Glass Substrates Material Information; Aug. 2002; pp. MIE 101-1-MIE 101-3; Corning Incorporated.
Couairon, A. et al.; Femtosecond filamentation in transparent media; ScienceDirect Physical Reports; Feb. 6, 2007; pp. 47-189; vol. 441; Elsevier B.V.
Courvoisier, F. et al.; Applications of femtosecond Bessel beams to laser ablation; Applied Physics A Materials Science & Processing; Sep. 6, 2012; pp. 29-34; vol. 112; Springer-Verlag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Ltd.
Duocastella, M. et al.; Bessel and annular beams for materials processing; Laser & Photonics Reviews; 2012; pp. 607-621; vol. 6, No. 5.
Durnin, J.; Exact solutions for nondiffracting beams. I. The scalar theory; J. Opt. Soc. Am. A; Apr. 1987; pp. 651-654; vol. 4, No. 4; Optical Society of America.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.

(56) References Cited

OTHER PUBLICATIONS

Gori, F. et al.; Analytical derivation of the optimum triplicator; Optics Communications; Dec. 1, 1998; pp. 13-16; vol. 157; Elsevier B.V.

Honda, M. et al.; A Novel Polymer Film that Controls Light Transmission; Progress in Pacific Polymer Science 3; 1994; pp. 159-169; Springer-Verlag Berlin Heidelberg.

Hu, Z. et al.; 5-Axis Laser Cutting Interference Detection and Correction Based on STL Model; Chinese Journal of Lasers; Dec. 2009; pp. 3313-3317; vol. 36, No. 12.

Huang, Z. et al.; Laser etching of glass substrates by 1064 nm laser irradiation; Applied Physics A Materials Science & Processing; Jun. 6, 2008; pp. 159-163; vol. 93; Springer-Verlag.

Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.

Karlsson, S. et al.; The Technology of Chemical Glass Strengthening—A Review; Glass Technology—European Journal of Glass Science and Technology Part A; Apr. 2010; pp. 41-54; vol. 51, No. 2.

Levy, U. et al.; Design, fabrication, and characterization of circular Dammann gratings based on grayscale lithography; Optics Letters; Mar. 15, 2010; pp. 880-882; vol. 35, No. 6; Optical Society of America.

Liu, X. et al.; Laser Ablation and Micromachining with Ultrashort Laser Pulses; IEEE Journal of Quantum Electronics; Oct. 1997; p. 1706-1716; vol. 33, No. 10; IEEE.

Maeda, K. et al.; Optical performance of angle dependent light control glass; Optical Materials Technology for Energy Efficiency and Solar Energy Conversion X; 1991; pp. 138-148; vol. 1536; SPIE.

Mbise, G. et al.; Angular selective window coatings; theory and experiments; J. Phys. D: Appl. Phys.; 1997; pp. 2103-2122; vol. 30; IOP Publishing Ltd.

McGloin, D. et al.; Bessel beams: diffraction in a new light; Contemporary Physics; Jan.-Feb. 2005; pp. 15-28; vol. 46; Taylor & Francis Ltd.

Merola, F. et al.; Characterization of Bessel beams generated by polymeric microaxicons; Measurement Science and Technology; May 15, 2012; pp. 1-10; vol. 23; IOP Publishing Ltd.

Mirkhalaf, M. et al.; Overcoming the brittleness of glass through bio-inspiration and micro-architecture; Nature Communications; Jan. 28, 2014; pp. 1-9; Macmillan Publishers Limited.

Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.

Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.

Serafetinides, A. et al.; Polymer Ablation by Ultra-Short Pulsed Lasers; Proceedings of SPIE; 2000; pp. 409-415.

Shah, L. et al.; Micromachining with a High Repetition Rate Femtosecond Fiber Laser; JLMN-Journal of Laser Micro/Nanoengineering; Nov. 2008; pp. 157-162; vol. 3, No. 3.

Shealy, D. et al.; Geometric optics-based design of laser beam shapers; Opt. Eng.; Nov. 2003; pp. 3123-3138; vol. 42, No. 11; Society of Photo-Optical Instrumentation Engineers.

Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.

Abramov, A. et al.; Laser separation of chemically strengthened glass; ScienceDirect Physics Procedia; 2010; pp. 285-290; vol. 5; Elsevier B.V.

Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.

Thiele, E.; Relation between Catalytic Activity and Size of Particle; Industrial and Engineering Chemistry; Jul. 1939; pp. 916-920; vol. 31, No. 7.

Toytman, I. et al.; Optical breakdown in transparent media with adjustable axial length and location; Optic Express; Nov. 22, 2010; pp. 24688-24698; vol. 18, No. 24; Optical Society of America.

Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 896711-1-896711-8; vol. 8967; SPIE.

Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.

Ra & RMS: Calculating Surface Roughness; Harrison Eelectropolishing; 2012.

Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.

GT ASF Grown Sapphire Cover and Touch Screen Material; www.gtat.com; 2012; pp. 1-2; GTAT Corporation.

Xu, H. et al.; Optimization of 3D laser cutting head orientation based on minimum energy consumption; Int J Adv Manuf Technol; Jun. 28, 2014; pp. 1283-1291; vol. 74; Springer-Verlag London.

\* cited by examiner

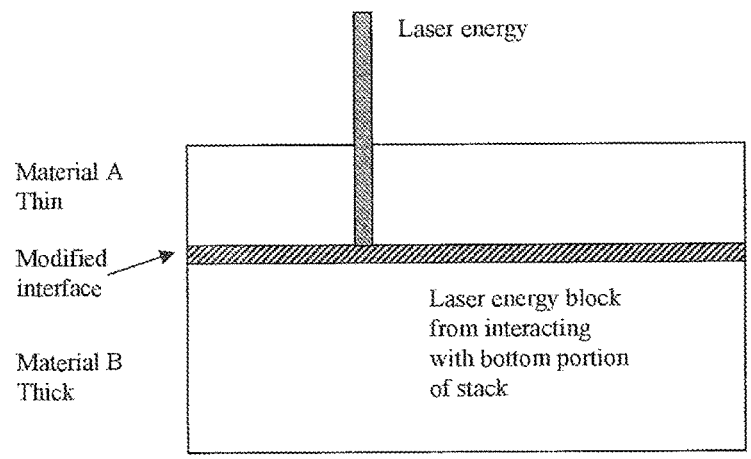
FIG. 1
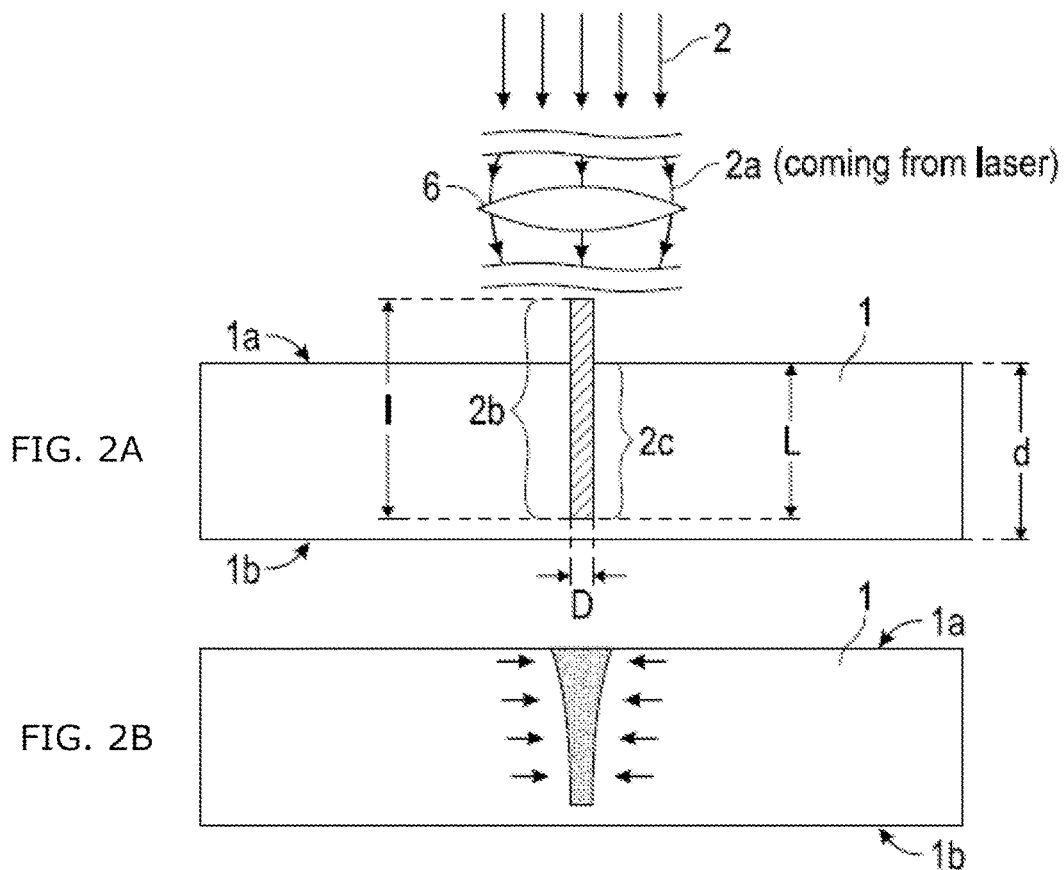
FIG. 2A
FIG. 2B

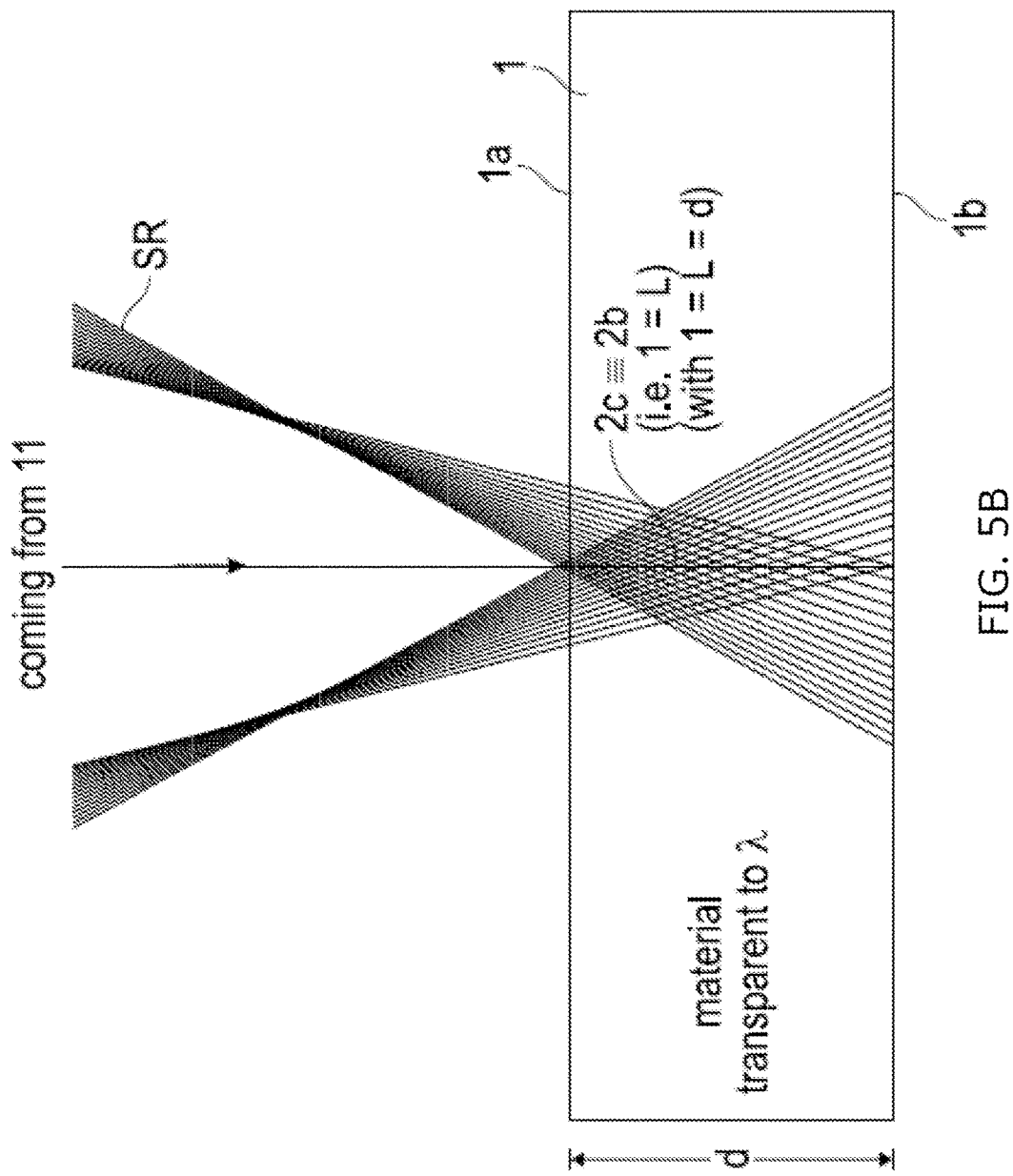

METHOD AND SYSTEM FOR ARRESTING CRACK PROPAGATION

CROSS-REFERENCE TO RELATED APPLICATIONS

This application claims the benefit of priority under 35 U.S.C. § 371 of International Application No. PCT/US2015/40241, filed on Jul. 14, 2015, which claims the benefit of priority under 35 U.S.C. § 119 of U.S. Provisional Application Ser. No. 62/024,059 filed on Jul. 14, 2014 the content of which is relied upon and incorporated herein by reference in its entirety.

BACKGROUND

The present invention relates to methods and apparatus for creating small (micron and smaller) holes in transparent materials for the purpose of drilling, cutting, separating, perforating, or otherwise processing the materials, and, more particularly, to the arrangement of these holes to arrest crack propagation in the transparent materials.

In recent years, precision micromachining and its improvement of process development to meet customer demand to reduce the size, weight and material cost of leading-edge devices has led to fast pace growth in high-tech industries in flat panel displays for touch screens, tablets, smartphones and TVs, where ultrafast industrial lasers are becoming important tools for applications requiring high precision.

There are various known ways to cut glasses. In conventional laser glass cutting processes, the separation of glass relies on laser scribing or perforation followed by separation with mechanical force or thermal stress-induced crack propagation. Nearly all current laser cutting techniques exhibit one or more shortcomings, including: (1) limitations in their ability to perform a free form shaped cut of thin glass on a carrier due to a large heat-affected zone associated with the long laser pulses (nanosecond scale or longer) used for cutting; (2) production of thermal stress that often results in cracking of the glass surface near the region of laser illumination due to the generation of shock waves and uncontrolled material removal; (3) difficulties in controlling the depth of the cut (e.g., to within tens of microns); and/or (4) creation of sub-surface damage in the glass that extends hundreds of microns (or more) glass below the surface of the glass, resulting in defect sites at which crack propagation can initiate.

These micro-cracks, for example, most typically form at the edges of the glass, and the crack can then propagate into the bulk of the glass. While there are different techniques to deal with crack propagation, such as ion-exchange used to create a compressive stress ("CS") at the edge of the glass sheet, these techniques are expensive and ineffective. Accordingly, there is a need to improve glass strength and stability by preventing or arresting crack propagation.

SUMMARY

The embodiments disclosed herein relate to a method and an apparatus to create small (micron and smaller) "holes" in transparent materials (glass, sapphire, etc.) for the purpose of drilling, cutting, separating, perforating, or otherwise processing the materials. More particularly, an ultrashort (i.e., from $10^{-10}$ to $10^{-15}$ second) pulse laser beam (wavelengths such as 1064, 532, 355 or 266 nanometers) is focused to an energy density above the threshold needed to create a defect in the region of focus at the surface of or within the transparent material. By repeating the process, a series of laser-induced defects aligned along a predetermined path can be created. By spacing the laser-induced features sufficiently close together, a controlled region of mechanical weakness within the transparent material can be created and the transparent material can be precisely fractured or separated (mechanically or thermally) along the path defined by the series of laser-induced defects. The ultrashort laser pulse(s) may be optionally followed by a carbon dioxide ($CO_2$) laser or other source of thermal stress to effect fully automated separation of a transparent material or part from a substrate, for example.

In certain applications where transparent materials are bonded together to form a stack or layered structure, it is often desirable to selectively "cut" to the boundary of a particular layer without disturbing underlying layers. This may be performed with the addition of a reflective or absorptive (for the desired wavelength) material or layer at the preferred depth of cut. A reflective layer may be formed by depositing a thin material (aluminum, copper, silver, gold, etc.). A reflective layer is preferential as it scatters the incident energy (as opposed to absorbing and thermally dissipating the incident energy). In this manner, the depth of the cut may be controlled with no damage to the underlying layers. In one application, a transparent material is bonded to a carrier substrate and a reflective or absorptive layer is formed between the transparent material and carrier substrate. The reflective or absorptive layer enables cutting of the transparent material without damage to the underlying carrier substrate, which may then be reused.

In one embodiment, a system for arresting propagation of an incident crack through a transparent material including: a laser assembly configured to selectively provide a pulsed laser beam; an optical assembly coupled to the laser assembly and configured to cause the pulsed laser beam to converge at a focal line, where the optical assembly is adjustable such that each focal line is characterized by a dimensional parameter and disposed at a position relative to the optical assembly; a workpiece holder configured to hold the transparent material at a position relative to the optical assembly, with either the workpiece holder or the optical assembly providing a relative motion between the transparent material and the optical assembly; and a controller coupled to the laser assembly, the optical assembly or the workpiece holder, the controller executing instructions representing a predetermined pattern designed to arrest an incident crack that propagates through the transparent material, the controller being configured to select the dimensional parameter for each pulsed laser beam, the controller being further configured to select the relative motion such that a plurality of the pulsed laser beam forms a plurality of defects corresponding to the predetermined pattern within the transparent material, each defect of the plurality of defects being substantially generated by induced absorption.

In another embodiment, the dimensional parameter has a focal line diameter, where the length of a defect corresponds to a portion of the focal line disposed within the laminated element when the defect is substantially generated by induced absorption.

In yet another embodiment, the predetermined pattern is designed to create a locking pattern such that the transparent material will not separate into two or more pieces if the crack propagates through the transparent material.

In one embodiment, a method for arresting propagation of an incident crack through a transparent material includes the steps of: focusing pulsed laser beams into a laser beam focal line directed into the transparent material, where each of the plurality of pulsed laser beams is directed into the transparent material at a different location corresponding to a predetermined pattern designed to arrest an incident crack that propagates through the transparent material; and generating, with the laser beam focal line, an induced absorption within the transparent material to produce a defect in the transparent material.

In another embodiment, the method also includes the step of determine the predetermined pattern based on a characteristic of the transparent material. The method can also include the additional step of filling, at least partially, the defect with a polymer.

According to one embodiment, the method includes the step of providing a laser beam assembly having: a laser assembly configured to selectively provide a pulsed laser beam; an optical assembly configured to cause the pulsed laser beam to converge at a focal line; a transparent material holder configured to hold the transparent material at a position relative to the optical assembly, where the transparent material holder or the optical assembly being provides a relative motion between the transparent material and the optical assembly; and a controller configured to execute instructions representing the predetermined pattern, and to select the relative motion such that a plurality of the pulsed laser beam forms a plurality of defects corresponding to the predetermined pattern within the transparent material.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the representative embodiments.

FIG. 1 is an illustration of a stack of three layers according to an embodiment: a thin material A facing the laser energy, a modified interface, and a thick material B, the modified interface disrupting the laser energy form interacting with the portion of the stack on the side of the modified interface remote from the laser beam;

FIGS. 2A and 2B are illustrations showing the positioning of a laser beam focal line according to an embodiment;

FIGS. 3B-1, 3B-2, 3B-3, and 3B-4 illustrate various possibilities for processing the substrate by forming the laser beam focal line at different positions within the transparent material relative to the substrate according to embodiments;

FIG. 4 is an illustration of a second optical assembly for laser processing according to an embodiment;

FIGS. 5A and 5B are illustrations of a third optical assembly for laser drilling according to an embodiment;

DETAILED DESCRIPTION

Figure 3A:
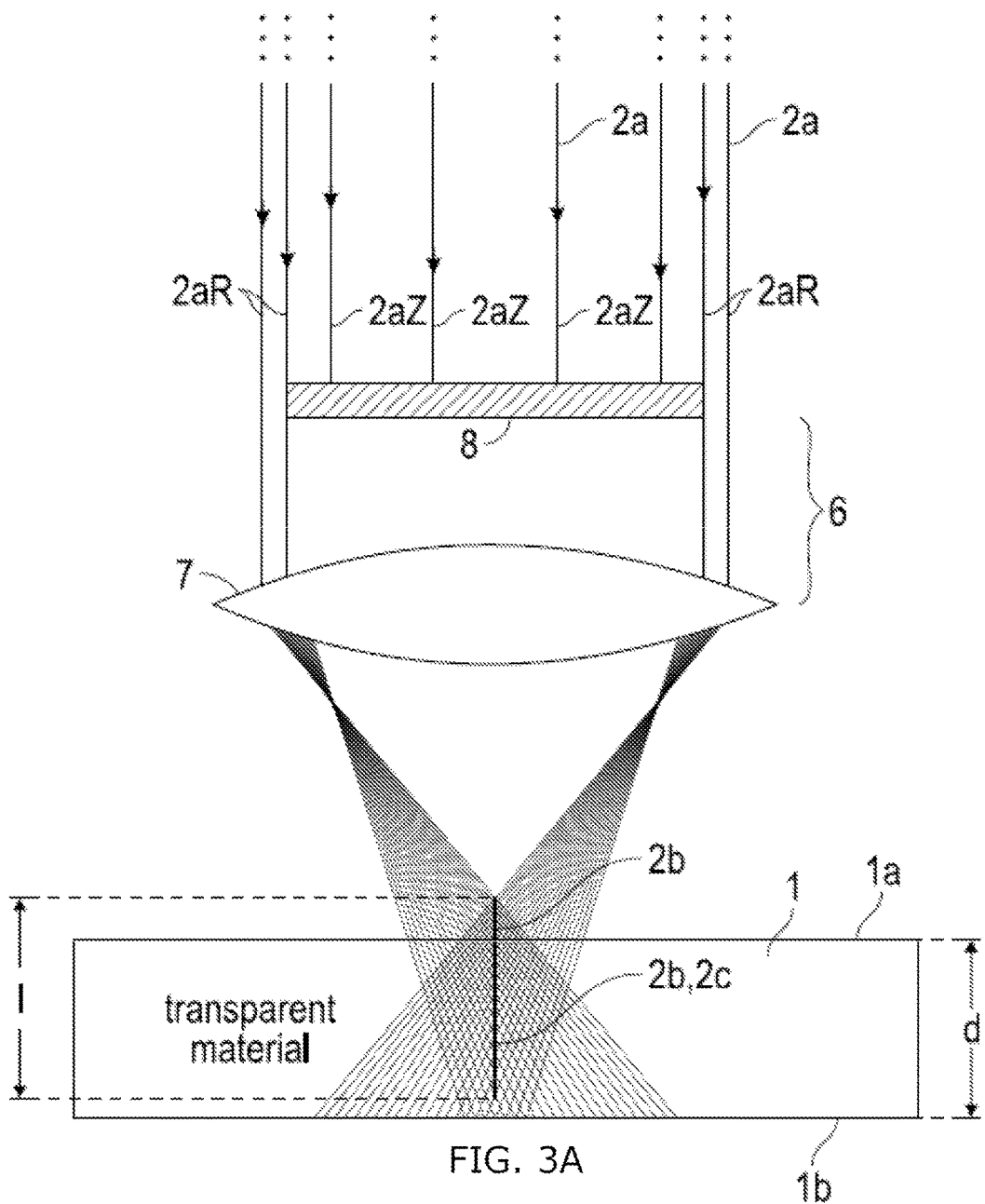
FIG. 3A is an illustration of an optical assembly for laser processing according to an embodiment.

A description of example embodiments follows.

The embodiment described herein relates to a method and apparatus for optically producing high precision cuts in or through transparent materials. Sub-surface damage may be limited to the order of 60 microns in depth or less, and the cuts may produce only low debris. Cutting of a transparent material with a laser in accordance with the present disclosure may also be referred to herein as drilling or laser drilling or laser processing. A material is substantially transparent to the laser wavelength when the absorption is less than about 10%, preferably less than about 1% per mm of material depth at this wavelength.

In accordance with methods described below, in a single pass, a laser can be used to create highly controlled full line perforation through the material, with extremely little (<75 μm, often <50 μm) subsurface damage and debris generation. This is in contrast to the typical use of spot-focused laser to ablate material, where multiple passes are often necessary to completely perforate the glass thickness, large amounts of debris are formed from the ablation process, and more extensive sub-surface damage (>100 µm) and edge chipping occur.

Thus, it is possible to create a microscopic (i.e., <0.5 µm and >100 nm in diameter) elongated "hole" (also called a perforation or a defect line) in transparent material using a single high energy burst pulse. These individual perforations can be created at rates of several hundred kilohertz (several hundred thousand perforations per second, for example). Thus, with relative motion between the source and the material these perforations can be placed adjacent to one another (spatial separation varying from sub-micron to several microns as desired). This spatial separation is selected in order to facilitate cutting. In some embodiments the defect line is a "through hole", which is a hole or an open channel that extends from the top to the bottom of the transparent material. In some embodiments the defect line may not be a continuous channel, and may be blocked or partially blocked by portions or sections of solid material (e.g., glass). As defined herein, the internal diameter of the defect line is the internal diameter of the open channel or the air hole. For example, in the embodiments described herein the internal diameter of the defect line is <500 nm, for example ≤400 nm, or <300 nm. The disrupted or modified area (e.g., compacted, melted, or otherwise changed) of the material surrounding the holes in the embodiments disclosed herein, preferably has diameter of <50 µm (e.g., <0.10 µm).

In addition, through judicious selection of optics, selective cut individual layers of stacked transparent materials. Micromachining and selective cutting of a stack of transparent materials is accomplished with precise control of the depth of cut through selection of an appropriate laser source and wavelength along with beam delivery optics, and the placement of a beam disruption element at the boundary of a desired layer. The beam disruption element may be a layer of material or an interface. The beam disruption element may be referred to herein as a laser beam disruption element, disruption element or the like. Embodiments of the beam disruption element may be referred to herein as a beam disruption layer, laser beam disruption layer, disruption layer, beam disruption interface, laser beam disruption interface, disruption interface, or the like.

The beam disruption element reflects, absorbs, scatters, defocuses or otherwise interferes with an incident laser beam to inhibit or prevent the laser beam from damaging or otherwise modifying underlying layers in the stack. In one embodiment, the beam disruption element underlies the layer of transparent material in which laser drilling will occur. As used herein, the beam disruption element underlies the transparent material when placement of the beam disruption element is such that the laser beam must pass through the transparent material before encountering the beam disruption element. The beam disruption element may underlie and be directly adjacent to the transparent layer in which laser drilling will occur. Stacked materials can be micromachined or cut with high selectivity by inserting a layer or modifying the interface such that a contrast of optical properties exists between different layers of the stack. By making the interface between materials in the stack more reflective, absorbing, and/or scattering at the laser wavelengths of interest, cutting can be confined to one portion or layer of the stack.

The wavelength of the laser is selected so that the material within the stack to be laser processed (drilled, cut, ablated, damaged or otherwise appreciably modified by the laser) is transparent to the laser wavelength. In one embodiment, the material to be processed by the laser is transparent to the laser wavelength if it absorbs less than 10% of the intensity of the laser wavelength per mm of thickness of the material. In another embodiment, the material to be processed by the laser is transparent to the laser wavelength if it absorbs less than 5% of the intensity of the laser wavelength per mm of thickness of the material. In still another, the material to be processed by the laser is transparent to the laser wavelength if it absorbs less than 2% of the intensity of the laser wavelength per mm of thickness of the material. In yet another embodiment, the material to be processed by the laser is transparent to the laser wavelength if it absorbs less than 1% of the intensity of the laser wavelength per mm of thickness of the material.

The selection of the laser source is further predicated on the ability to induce multiphoton absorption (MPA) in the transparent material. MPA is the simultaneous absorption of multiple photons of identical or different frequencies in order to excite a material from a lower energy state (usually the ground state) to a higher energy state (excited state). The excited state may be an excited electronic state or an ionized state. The energy difference between the higher and lower energy states of the material is equal to the sum of the energies of the two photons. MPA is a third-order nonlinear process that is several orders of magnitude weaker than linear absorption. It differs from linear absorption in that the strength of absorption depends on the square of the light intensity, thus making it a nonlinear optical process. At ordinary light intensities, MPA is negligible. If the light intensity (energy density) is extremely high, such as in the region of focus of a laser source (particularly a pulsed laser source), MPA becomes appreciable and leads to measurable effects in the material within the region where the energy density of the light source is sufficiently high. Within the focal region, the energy density may be sufficiently high to result in ionization.

At the atomic level, the ionization of individual atoms has discrete energy requirements. Several elements commonly used in glass (e.g., Si, Na, K) have relatively low ionization energies (~5 eV). Without the phenomenon of MPA, a wavelength of about 248 nm would be required to create linear ionization at ~5 eV. With MPA, ionization or excitation between states separated in energy by ~5 eV can be accomplished with wavelengths longer than 248 nm. For example, photons with a wavelength of 532 nm have an energy of ~2.33 eV, so two photons with wavelength 532 nm can induce a transition between states separated in energy by ~4.66 eV in two-photon absorption (TPA), for example.

Thus, atoms and bonds can be selectively excited or ionized in the regions of a material where the energy density of the laser beam is sufficiently high to induce nonlinear TPA of a laser wavelength having half the required excitation energy, for example. MPA can result in a local reconfiguration and separation of the excited atoms or bonds from adjacent atoms or bonds. The resulting modification in the bonding or configuration can result in non-thermal ablation and removal of matter from the region of the material in which MPA occurs. This removal of matter creates a structural defect (e.g. a defect line or "perforation") that mechanically weakens the material and renders it more susceptible to cracking or fracturing upon application of mechanical or thermal stress. By controlling the placement of perforations, a contour or path along which cracking occurs can be precisely defined and precise micromachining of the material can be accomplished. The contour defined by a series of perforations may be regarded as a fault line and corresponds to a region of structural weakness in the material. In one embodiment, micromachining includes separation of a part from the material processed by the laser, where the part has a precisely defined shape or perimeter determined by a closed contour of perforations formed through MPA effects induced by the laser. As used herein, the term closed contour refers to a perforation path formed by the laser line, where the path intersects with itself at some location. An internal contour is a path formed where the resulting shape is entirely surrounded by an outer portion of material.

Perforations can be accomplished with a single "burst" of high energy short duration pulses spaced close together in time. The laser pulse duration may be $10^{-10}$ s or less, or $10^{-11}$ s or less, or $10^{-12}$ s or less, or $10^{-13}$ s or less. These "bursts" may be repeated at high repetition rates (e.g. kHz or MHz). The perforations may be spaced apart and precisely positioned by controlling the velocity of a substrate or stack relative to the laser through control of the motion of the laser and/or the substrate or stack.

As an example, in a thin transparent substrate moving at 200 mm/sec exposed to a 100 kHz series of pulses, the individual pulses would be spaced 2 microns apart to create a series of perforations separated by 2 microns. This defect (perforation) spacing is sufficient close to allow for mechanical or thermal separation along the contour defined by the series of perforations.

Thermal Separation:

In some cases, a fault line created along a contour defined by a series of perforations or defect lines is not enough to separate the part spontaneously, and a secondary step may be necessary. If so desired, a second laser can be used to create thermal stress to separate it, for example. In the case of sapphire, separation can be achieved, after the creation of a fault line, by application of mechanical force or by using a thermal source (e.g., an infrared laser, for example a $CO_2$ laser) to create thermal stress and force a part to separate from a substrate. Another option is to have the $CO_2$ laser only start the separation and then finish the separation manually. The optional $CO_2$ laser separation can be achieved, for example, with a defocused continuous wave (cw) laser emitting at 10.6 µm and with power adjusted by controlling its duty cycle. Focus change (i.e., extent of defocusing up to and including focused spot size) is used to vary the induced thermal stress by varying the spot size. Defocused laser beams include those laser beams that produce a spot size larger than a minimum, diffraction-limited spot size on the order of the size of the laser wavelength. For example, spot sizes of about 7 mm, 2 mm and 20 mm can be used for $CO_2$ lasers, for example, whose emission wavelength is much smaller at 10.6 µm. Distance between adjacent defect lines 120 along the direction of the fault lines 110 can be greater than 0.5 µm and less than or equal to about 15 µm in some embodiments, for example.

Etching:

Acid etching can be used, for example, to separate a workpiece having a glass layer, for example. To enlarge the holes to a size useful for metal filling and electrical connections, parts can be acid etched. In one embodiment, for example, the acid used can be 10% HF/15% $HNO_3$ by volume. The parts can be etched for 53 minutes at a temperature of 24-25° C. to remove about 100 µm of material, for example. The parts can be immersed in this acid bath, and ultrasonic agitation at a combination of 40 kHz and 80 kHz frequencies can used to facilitate penetration of fluid and fluid exchange in the holes. In addition, manual agitation of the part within the ultrasonic field can be made to prevent standing wave patterns from the ultrasonic field from creating "hot spots" or cavitation related damage on the part. The acid composition and etch rate can be intentionally designed to slowly etch the part—a material removal rate of only 1.9 um/minute, for example. An etch rate of less than about 2 µm/minute, for example, allows acid to fully penetrate the narrow holes and agitation to exchange fresh fluid and remove dissolved material from the holes which are initially very narrow.

Figures 1, 3B:
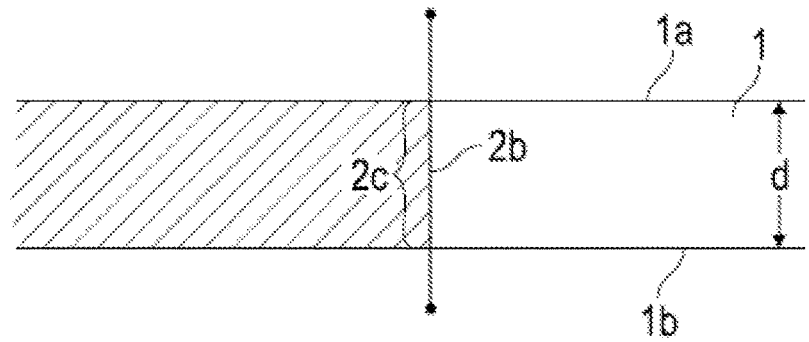

In the embodiment shown in FIG. 1, precise control of the depth of cut in a multilayer stack is achieved by inclusion of a beam disruption interface (labeled "modified interface"). The beam disruption interface prevents the laser radiation from interacting with portions of the multilayer stack beyond the position of the disruption interface.

In one embodiment, the beam disruption element is positioned immediately below the layer of the stack in which modification via two-photon absorption will occur. Such a configuration is shown in FIG. 1, where the beam disruption element is a modified interface positioned immediately below material A and material A is the material in which formation of perforations through the two-photon absorption mechanism described herein will occur. As used herein, reference to a position below or lower than another position assumes that the top or uppermost position is the surface of the multilayer stack upon which the laser beam is first incident. In FIG. 1, for example, the surface of material A that is closest to the laser source is the top surface and placement of the beam disruption element below material A means that the laser beam traverses material A before interacting with the beam disruption element.

The disruption element has different optical properties than the material to be cut. For example, the beam disruption element may be a defocusing element, a scattering element, a translucent element, or a reflective element. A defocusing element is an interface or a layer comprising a material that prevents the laser light from forming the laser beam focal line on or below the defocusing element. The defocusing element may be comprised of a material or interface with refractive index in homogeneities that scatter or perturb the wavefront of the optical beam. A translucent element is an interface or layer of material that allows light to pass through, but only after scattering or attenuating the laser beam to lower the energy density sufficiently to prevent formation of a laser beam focal line in portions of the stack on the side of the translucent element that are remote from the laser beam. In one embodiment, the translucent element effects scattering or deviating of at least 10% of the light rays of the laser beam.

More specifically, the reflectivity, absorptivity, defocusing, attenuation, and/or scattering of the disruption element can be employed to create a barrier or impediment to the laser radiation. The laser beam disruption element can be created by several means. If the optical properties of the overall stack system are not of a concern, then one or more thin films can be deposited as a beam disruption layer(s) between the desired two layers of the stack, where the one or more thin films absorb, scatter, defocus, attenuate, reflects, and/or dissipates more of the laser radiation than the layer immediately above it to protect layers below the thin film(s) from receiving excessive energy density from the laser source. If the optical properties of the entire stack system do matter, the beam disruption element can be implemented as a notch filter. This can be done by several methods:

creating structures at the disruption layer or interface (e.g. via thin film growth, thin film patterning, or surface patterning) such that diffraction of incident laser radiation is at a particular wavelength or range of wavelengths occurs;

creating structures at the disruption layer or interface (e.g. via thin film growth, thin film patterning, or surface pattering) such that scattering of incident laser radiation occurs (e.g. a textured surface);

creating structures at the disruption layer or interface (e.g. via thin film growth, thin film patterning, or surface pattering) such that attenuated phase-shifting of laser radiation occurs; and creating a distributed Bragg reflector via thin-film stack at the disruption layer or interface to reflect only laser radiation.

It is not necessary that the absorption, reflection scattering, attenuation, defocusing etc. of the laser beam by the disruption element be complete. It is only necessary that the effect of the disruption element on the laser beam is sufficient to reduce the energy density or intensity of the focused laser beam to a level below the threshold required for cutting, ablation, perforating etc. of the layers in the stack protected by (underlying) the disruption element. In one embodiment, the disruption element reduces the energy density or intensity of the focused laser beam to a level below the threshold needed to induce two-photon absorption. The disruption layer or disruption interface may be configured to absorb, reflect, or scatter the laser beam, where the absorption, reflection, or scattering are sufficient to reduce the energy density or intensity of the laser beam transmitted to the carrier (or other underlying layer) to a level below the level needed to induce nonlinear absorption in the carrier or underlying layer.

Turning to FIGS. 2A and 2B, a method of laser drilling a material includes focusing a pulsed laser beam 2 into a laser beam focal line 2b, viewed along the beam propagation direction. Laser beam focal line 2b is a region of high energy density. As shown in FIG. 3, laser 3 (not shown) emits laser beam 2, which has a portion 2a incident to optical assembly 6. The optical assembly 6 turns the incident laser beam into an extensive laser beam focal line 2b on the output side over a defined expansion range along the beam direction (length l of the focal line).

Layer 1 is the layer of a multilayer stack in which internal modifications by laser processing and two-photon absorption is to occur. Layer 1 is a component of a larger workpiece, which typically includes a substrate or carrier upon which a multilayer stack is formed. Layer 1 is the layer within the multilayer stack in which holes, cuts, or other features are to be formed through two-photon absorption assisted ablation or modification as described herein. The layer 1 is positioned in the beam path to at least partially overlap the laser beam focal line 2b of laser beam 2. Reference 1a designates the surface of the layer 1 facing (closest or proximate to) the optical assembly 6 or the laser, respectively, reference 1b designates the reverse surface of layer 1 (the surface remote, or further away from, optical assembly 6 or the laser). The thickness of the layer 1 (measured perpendicularly to the planes 1a and 1b, i.e., to the substrate plane) is labeled with d.

As FIG. 2A depicts, layer 1 is aligned perpendicular to the longitudinal beam axis and thus behind the same focal line 2b produced by the optical assembly 6 (the substrate is perpendicular to the plane of the drawing). Viewed along the beam direction, the layer 1 is positioned relative to the focal line 2b in such a way that the focal line 2b (viewed in the direction of the beam) starts before the surface 1a of the layer 1 and stops before the surface 1b of the layer 1, i.e. focal line 2b terminates within the layer 1 and does not extend beyond surface 1b. In the overlapping area of the laser beam focal line 2b with layer 1, i.e. in the portion of layer 1 overlapped by focal line 2b, the extensive laser beam focal line 2b generates nonlinear absorption in layer 1. (Assuming suitable laser intensity along the laser beam focal line 2b, which intensity is ensured by adequate focusing of laser beam 2 on a section of length l (i.e. a line focus of length l), which defines an extensive section 2c (aligned along the longitudinal beam direction) along which an induced nonlinear absorption is generated in the layer 1.) The induced nonlinear absorption results in formation of a defect line or crack in layer 1 along section 2c. The defect or crack formation is not only local, but rather may extend over the entire length of the extensive section 2c of the induced absorption. The length of section 2c (which corresponds to the length of the overlapping of laser beam focal line 2b with layer 1) is labeled with reference L. The average diameter or extent of the section of the induced absorption 2c (or the sections in the material of layer 1 undergoing the defect line or crack formation) is labeled with reference D. This average extent D basically corresponds to the average diameter 6 of the laser beam focal line 2b, that is, an average spot diameter in a range of between about 0.1 µm and about 5 µm.

As FIG. 2A shows, the layer 1 (which is transparent to the wavelength λ of laser beam 2) is locally heated due to the induced absorption along the focal line 2b. The induced absorption arises from the nonlinear effects associated with the high intensity (energy density) of the laser beam within focal line 2b. FIG. 2B illustrates that the heated layer 1 will eventually expand so that a corresponding induced tension leads to micro-crack formation, with the tension being the highest at surface 1a.

Representative optical assemblies 6, which can be applied to generate the focal line 2b, as well as a representative optical setup, in which these optical assemblies can be applied, are described below. All assemblies or setups are based on the description above so that identical references are used for identical components or features or those which are equal in their function. Therefore only the differences are described below.

To insure high quality (regarding breaking strength, geometric precision, roughness and avoidance of re-machining requirements) of the surface of separation after cracking along the contour defined by the series of perforations, the individual focal lines used to form the perforations that define the contour of cracking should be generated using the optical assembly described below (hereinafter, the optical assembly is alternatively also referred to as laser optics). The roughness of the separated surface is determined primarily by the spot size or the spot diameter of the focal line. A roughness of a surface can be characterized, for example, by an Ra surface roughness statistic (roughness arithmetic average of absolute values of the heights of the sampled surface). In order to achieve a small spot size of, for example, 0.5 µm to 2 µm in case of a given wavelength λ of laser 3 (interaction with the material of layer 1), certain requirements must usually be imposed on the numerical aperture of laser optics 6. These requirements are met by laser optics 6 described below.

In order to achieve the required numerical aperture, the optics must, on the one hand, dispose of the required opening for a given focal length, according to the known Abbé formulae (N.A.=n sin (theta), n: refractive index of the material to be processed, theta: half the aperture angle; and theta=arctan (D/2f); D: aperture, f: focal length). On the other hand, the laser beam must illuminate the optics up to the required aperture, which is typically achieved by means of beam widening using widening telescopes between the laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only vary slightly.

According to FIG. 3A (section perpendicular to the substrate plane at the level of the central beam in the laser beam bundle of laser radiation 2; here, too, laser beam 2 is perpendicularly incident to the layer 1, i.e. incidence angle β is 0° so that the focal line 2b or the extensive section of the induced absorption 2c is parallel to the substrate normal), the laser radiation 2a emitted by laser 3 is first directed onto a circular aperture 8 which is completely opaque to the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely blocked by it. Only the beams in the outer perimeter range of beam bundle 2a (marginal rays, here labeled with 2aR) are not blocked due to the reduced aperture size compared to the beam diameter, but pass aperture 8 laterally and hit the marginal areas of the focusing optic elements of the optical assembly 6, which, in this embodiment, is designed as a spherically cut, bi-convex lens 7.

Lens 7 is centered on the central beam and is designed as a non-corrected, bi-convex focusing lens in the form of a common, spherically cut lens. The spherical aberration of such a lens may be advantageous. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (defined by the distance required for the intensity of the beam to decrease to 1/e of the peak intensity) and approximately 75% of the diameter of the lens of the optical assembly 6. The focal line 2b of a non-aberration-corrected spherical lens 7 generated by blocking out the beam bundles in the center is thus used. FIG. 3A shows the section in one plane through the central beam, the complete three-dimensional bundle can be seen when the depicted beams are rotated around the focal line 2b.

One potential disadvantage of this type of focal line is that the conditions (spot size, laser intensity) may vary along the focal line (and thus along the desired depth in the material) and therefore the desired type of interaction (no melting, induced absorption, thermal-plastic deformation up to crack formation) may possibly occur only in selected portions of the focal line. This means in turn that possibly only a part of the incident laser light is absorbed by the material to be processed in the desired way. In this way, the efficiency of the process (required average laser power for the desired separation speed) may be impaired, and the laser light may also be transmitted into undesired regions (parts or layers adherent to the substrate or the substrate holding fixture) and interact with them in an undesirable way (e.g. heating, diffusion, absorption, unwanted modification).

Figures 2, 3B:
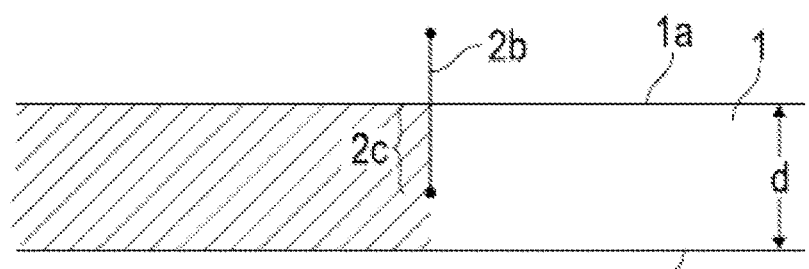
Figures 3, 3B:
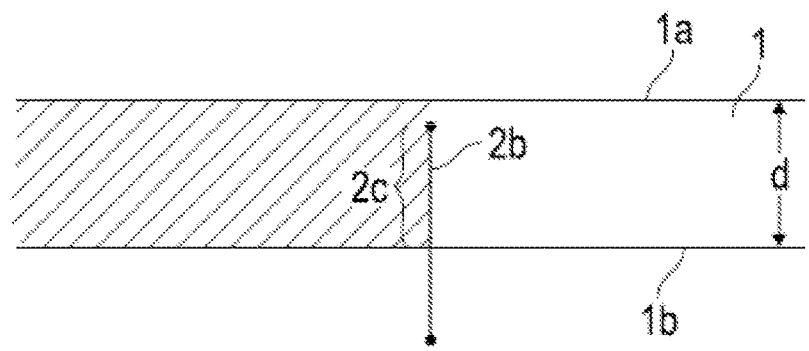
Figures 3, 3B, 4:
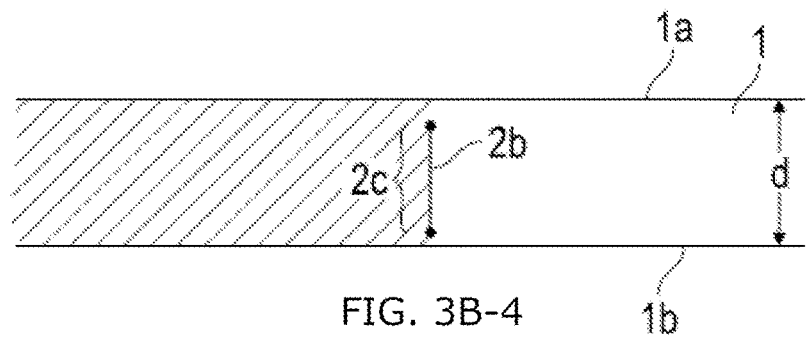
Figure 4:
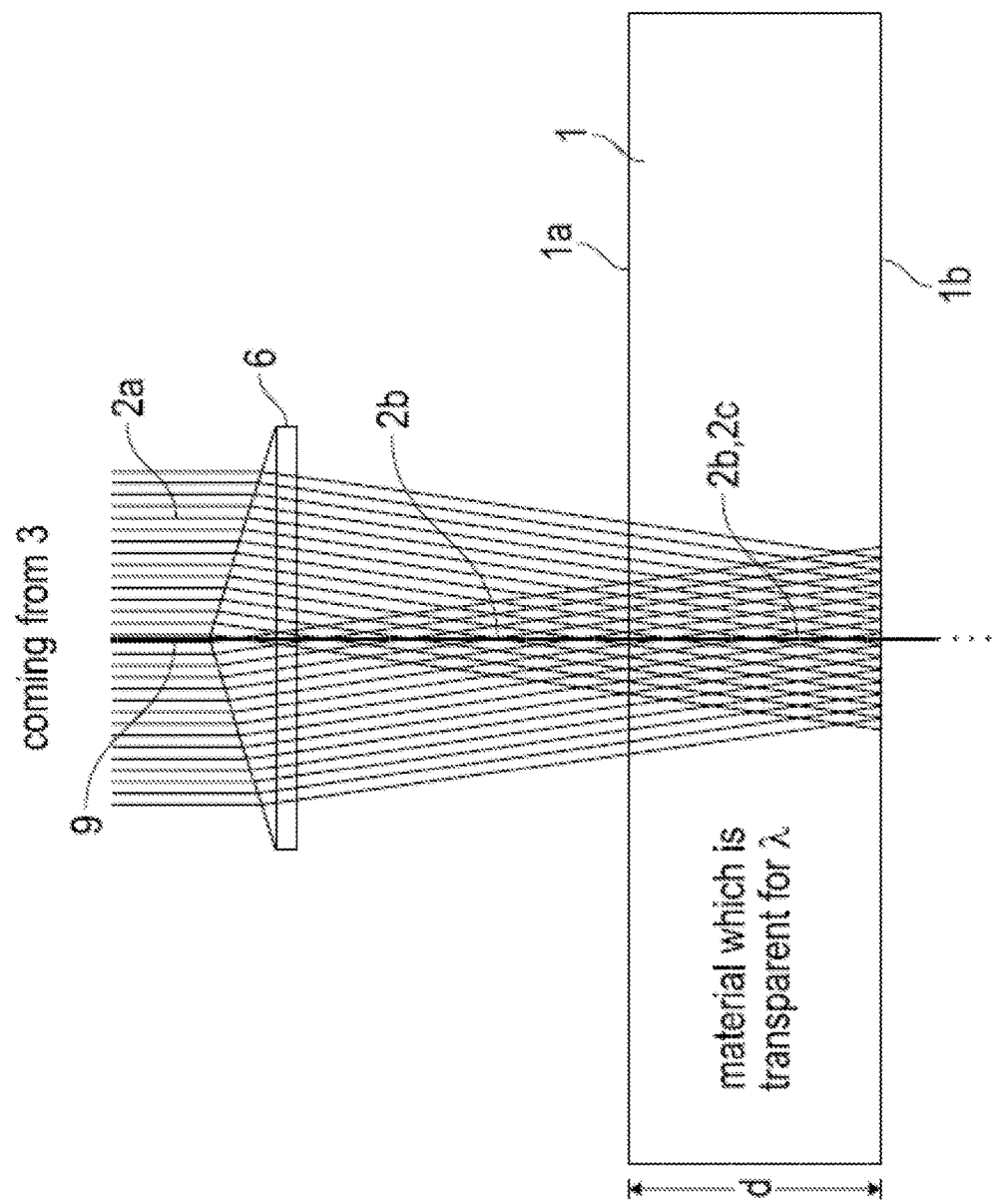

FIG. 3B-1-4 show (not only for the optical assembly in FIG. 3A, but also for any other applicable optical assembly 6) that the position of laser beam focal line 2b can be controlled by suitably positioning and/or aligning the optical assembly 6 relative to layer 1 as well as by suitably selecting the parameters of the optical assembly 6: As FIG. 3B-1 illustrates, the length 1 of the focal line 2b can be adjusted in such a way that it exceeds the layer thickness d (here by factor 2). If layer 1 is placed (viewed in longitudinal beam direction) centrally to focal line 2b, an extensive section of induced absorption 2c is generated over the entire substrate thickness.

In the case shown in FIG. 3B-2, a focal line 2b of length 1 is generated which corresponds more or less to the layer thickness d. Since layer 1 is positioned relative to line 2b in such a way that line 2b starts at a point outside the material to be processed, the length L of the section of extensive induced absorption 2c (which extends here from the substrate surface to a defined substrate depth, but not to the reverse surface 1b) is smaller than the length 1 of focal line 2b. FIG. 3B-3 shows the case in which the substrate 1 (viewed along the beam direction) is positioned above the starting point of focal line 2b so that, as in FIG. 3B-2, the length 1 of line 2b is greater than the length L of the section of induced absorption 2c inlayer 1. The focal line thus starts within the layer 1 and extends beyond the reverse surface 1b. FIG. 3B-4 shows the case in which the focal line length 1 is smaller than the layer thickness d so that—in the case of a central positioning of the substrate relative to the focal line viewed in the direction of incidence—the focal line starts near the surface 1a within the layer 1 and ends near the surface 1b within the layer 1 (e.g. 1=0.75·d). The laser beam focal line 2b can have a length 1 in a range of between about 0.1 mm and about 100 mm or in a range of between about 0.1 mm and about 10 mm, for example. Various embodiments can be configured to have length 1 of about 0.1 mm, 0.2 mm, 0.3 mm, 0.4 mm, 0.5 mm, 0.7 mm, 1 mm, 2 mm, 3 mm or 5 mm, for example.

It is particularly advantageous to position the focal line 2b in such a way that at least one of surfaces 1a, 1b is covered by the focal line, so that the section of induced nonlinear absorption 2c starts at least on one surface of the layer or material to be processed. In this way it is possible to achieve virtually ideal cuts while avoiding ablation, feathering and particulation at the surface.

FIG. 4 depicts another applicable optical assembly 6. The basic construction follows the one described in FIG. 3A so that only the differences are described below. The depicted optical assembly is based the use of optics with a non-spherical free surface in order to generate the focal line 2b, which is shaped in such a way that a focal line of defined length 1 is formed. For this purpose, aspheres can be used as optic elements of the optical assembly 6. In FIG. 4, for example, a so-called conical prism, also often referred to as axicon, is used. An axicon is a special, conically cut lens which forms a spot source on a line along the optical axis (or transforms a laser beam into a ring). The layout of such an axicon is principally known to those of skill in the art; the cone angle in the example is 10°. The apex of the axicon labeled here with reference 9 is directed towards the incidence direction and centered on the beam center. Since the focal line 2b produced by the axicon 9 starts within its interior, layer 1 (here aligned perpendicularly to the main beam axis) can be positioned in the beam path directly behind axicon 9. As FIG. 4 shows, it is also possible to shift layer 1 along the beam direction due to the optical characteristics of the axicon while remaining within the range of focal line 2b. The section of extensive induced absorption 2c in the material of layer 1 therefore extends over the entire depth d.

However, the depicted layout is subject to the following restrictions: Since the region of focal line 2b formed by axicon 9 begins within the axicon 9, a significant part of the laser energy is not focused into the section of induced absorption 2c of focal line 2b, which is located within the material, in the situation where there is a separation between axicon 9 and the material to be processed. Furthermore, length 1 of focal line 2b is related to the beam diameter through the refractive indices and cone angles of axicon 9. This is why, in the case of relatively thin materials (several millimeters), the total focal line is much longer than the thickness of the material to be processed, having the effect that much of the laser energy is not focused into the material.

Figure 5A:
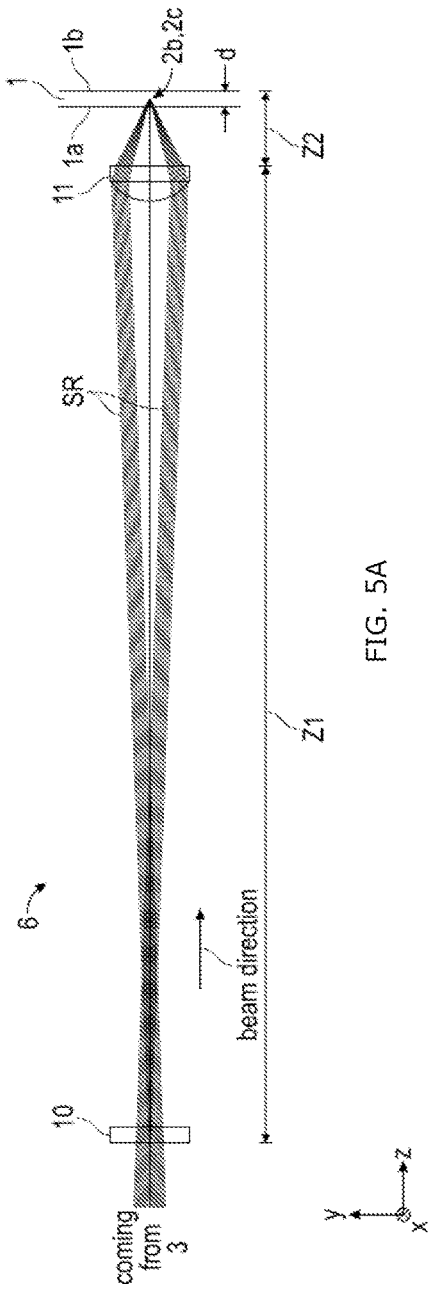

For this reason, it may be desirable to use an optical assembly 6 that includes both an axicon and a focusing lens. FIG. 5A depicts such an optical assembly 6 in which a first optical element (viewed along the beam direction) with a non-spherical free surface designed to form an extensive laser beam focal line 2b is positioned in the beam path of laser 3. In the case shown in FIG. 5A, this first optical element is an axicon 10 with a cone angle of 5°, which is positioned perpendicularly to the beam direction and centered on laser beam 3. The apex of the axicon is oriented towards the beam direction. A second, focusing optical element, here the plano-convex lens 11 (the curvature of which is oriented towards the axicon), is positioned in the beam direction at a distance z1 from the axicon 10. The distance z1, in this case approximately 300 mm, is selected in such a way that the laser radiation formed by axicon 10 is circularly incident on the outer radial portion of lens 11. Lens 11 focuses the circular radiation on the output side at a distance z2, in this case approximately 20 mm from lens 11, on a focal line 2b of a defined length, in this case 1.5 mm. The effective focal length of lens 11 is 25 mm in this embodiment. The circular transformation of the laser beam by axicon 10 is labeled with the reference SR.

FIG. 5B depicts the formation of the focal line 2b or the induced absorption 2c in the material of layer 1 according to FIG. 5A in detail. The optical characteristics of both elements 10, 11 as well as the positioning of them is selected in such a way that the length 1 of the focal line 2b in beam direction is exactly identical with the thickness d of layer 1. Consequently, an exact positioning of layer 1 along the beam direction is required in order to position the focal line 2b exactly between the two surfaces 1a and 1b of layer 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly (annularly) over a particular outer radial region, which, on the one hand, serves to realize the required numerical aperture and thus the required spot size, and, on the other hand, however, the circle of diffusion diminishes in intensity after the required focal line 2b over a very short distance in the center of the spot, as a basically circular spot is formed. In this way, the crack formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length 1 of focal line 2b can be adjusted via the beam diameter on the axicon. The numerical aperture along the focal line, on the other hand, can be adjusted via the distance z1 axicon-lens and via the cone angle of the axicon. In this way, the entire laser energy can be concentrated in the focal line.

If the crack formation is intended to continue to the back side of the layer or material to be processed, the circular (annular) illumination still has the advantage that (1) the laser power is used optimally in the sense that most of the laser light remains concentrated in the required length of the focal line, and (2) it is possible to achieve a uniform spot size along the focal line—and thus a uniform separation process along the perforations produced by the focal lines—due to the circularly illuminated zone in conjunction with the desired aberration set by means of the other optical functions.

Instead of the plano-convex lens depicted in FIG. 5A, it is also possible to use a focusing meniscus lens or another higher corrected focusing lens (asphere, multi-lens system).

In order to generate very short focal lines 2b using the combination of an axicon and a lens depicted in FIG. 5A, it would be necessary to select a very small beam diameter of the laser beam incident on the axicon. This has the practical disadvantage that the centering of the beam onto the apex of the axicon must be very precise and that the result is very sensitive to directional variations of the laser (beam drift stability). Furthermore, a tightly collimated laser beam is very divergent, i.e. due to the light deflection the beam bundle becomes blurred over short distances.

Figure 6:
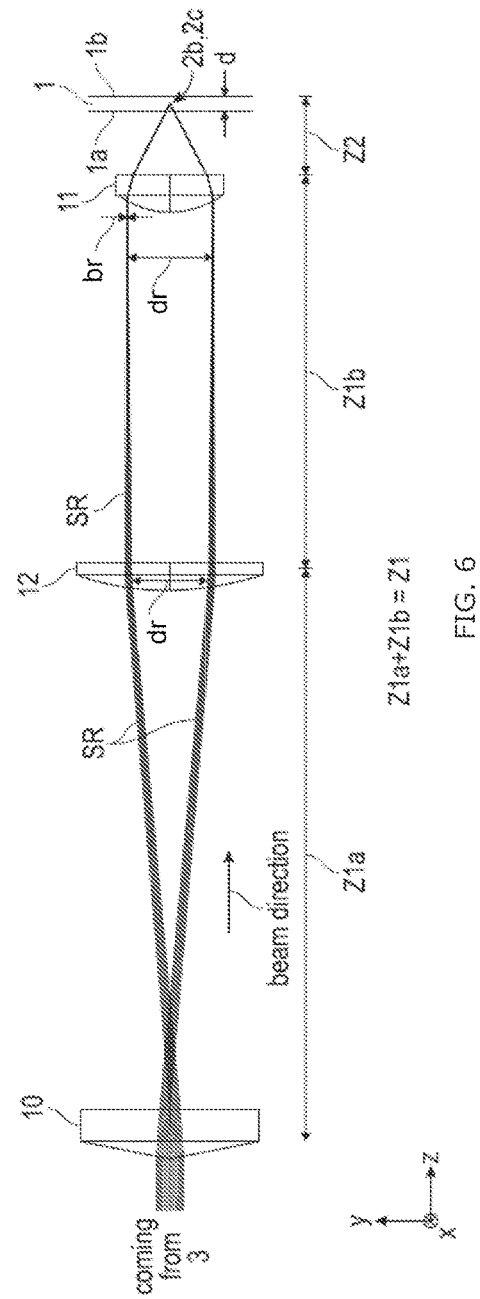
FIG. 6 is a schematic illustration of a fourth optical assembly for laser processing according to an embodiment.

As shown in FIG. 6, both effects can be avoided by including another lens, a collimating lens 12 in the optical assembly 6. The additional positive lens 12 serves to adjust the circular illumination of focusing lens 11 very tightly. The focal length f of collimating lens 12 is selected in such a way that the desired circle diameter dr results from distance z1a from the axicon to the collimating lens 12, which is equal to f. The desired width br of the ring can be adjusted via the distance z1b (collimating lens 12 to focusing lens 11). As a matter of pure geometry, the small width of the circular illumination leads to a short focal line. A minimum can be achieved at distance f.

The optical assembly 6 depicted in FIG. 6 is thus based on the one depicted in FIG. 5A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as z1a, the distance of focusing lens 11 from collimating lens 12 as z1b, and the distance of the focal line 2b from the focusing lens 11 as z2 (always viewed in beam direction). As shown in FIG. 6, the circular radiation SR formed by axicon 10, which is incident divergently and under the circle diameter dr on the collimating lens 12, is adjusted to the required circle width br along the distance z1b for an at least approximately constant circle diameter dr at the focusing lens 11. In the case shown, a very short focal line 2b is intended to be generated so that the circle width br of approx. 4 mm at lens 12 is reduced to approx. 0.5 mm at lens 11 due to the focusing properties of lens 12 (circle diameter dr is 22 mm in the example).

In the depicted example it is possible to achieve a length of the focal line 1 of less than 0.5 mm using a typical laser beam diameter of 2 mm, a focusing lens 11 with a focal length f=25 mm, a collimating lens with a focal length f'=150 mm, and choosing distances $Z1a=Z1b=140$ mm and $Z2=15$ mm.

Figure 7:
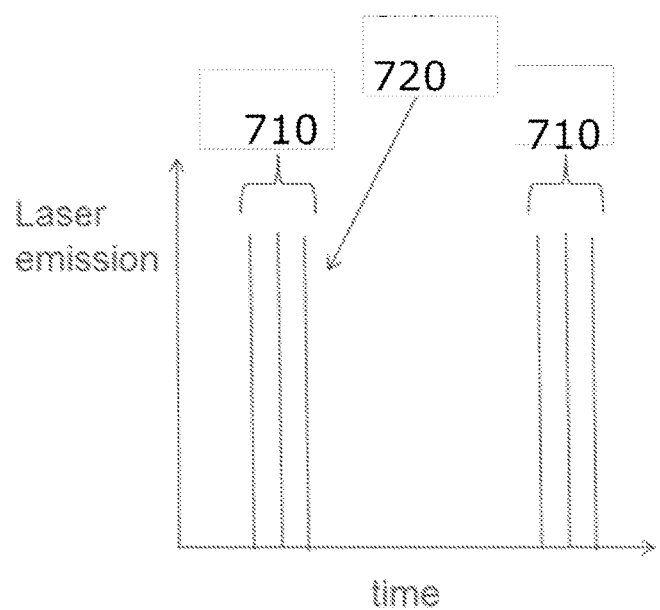
FIG. 7 is a graph of laser emission as a function of time for a picosecond laser according to an embodiment, where each emission is characterized by a pulse "burst" which may contain one or more sub-pulses, the frequency of the bursts is the repetition rate of the laser, typically about 100 kHz (10 μsec), and the time between sub-pulses is much shorter, e.g., about 20 nanoseconds (nsec)

Note that, as shown in FIG. 7, the typical operation of such a picosecond laser creates a "burst" 710 of pulses 720. Each "burst" 710 may contain multiple pulses 720 (such as 2 pulses, 3 pulses as shown in FIG. 7, 4 pulses, 5 pulses or more) of very short duration (~10 psec). Each pulse 720 is separated in time by a duration in a range of between about 1 nsec and about 50 nsec, such as approximately 20 nsec (50 MHz), with the time often governed by the laser cavity design. The time between each "burst" 710 will be much longer, often about 10 μsec, for a laser repetition rate of about 100 kHz. The exact timings, pulse durations, and repetition rates can vary depending on the laser design, but short pulses (i.e., less than about 15 psec) of high intensity have been shown to work well with this technique.

Figure 8:
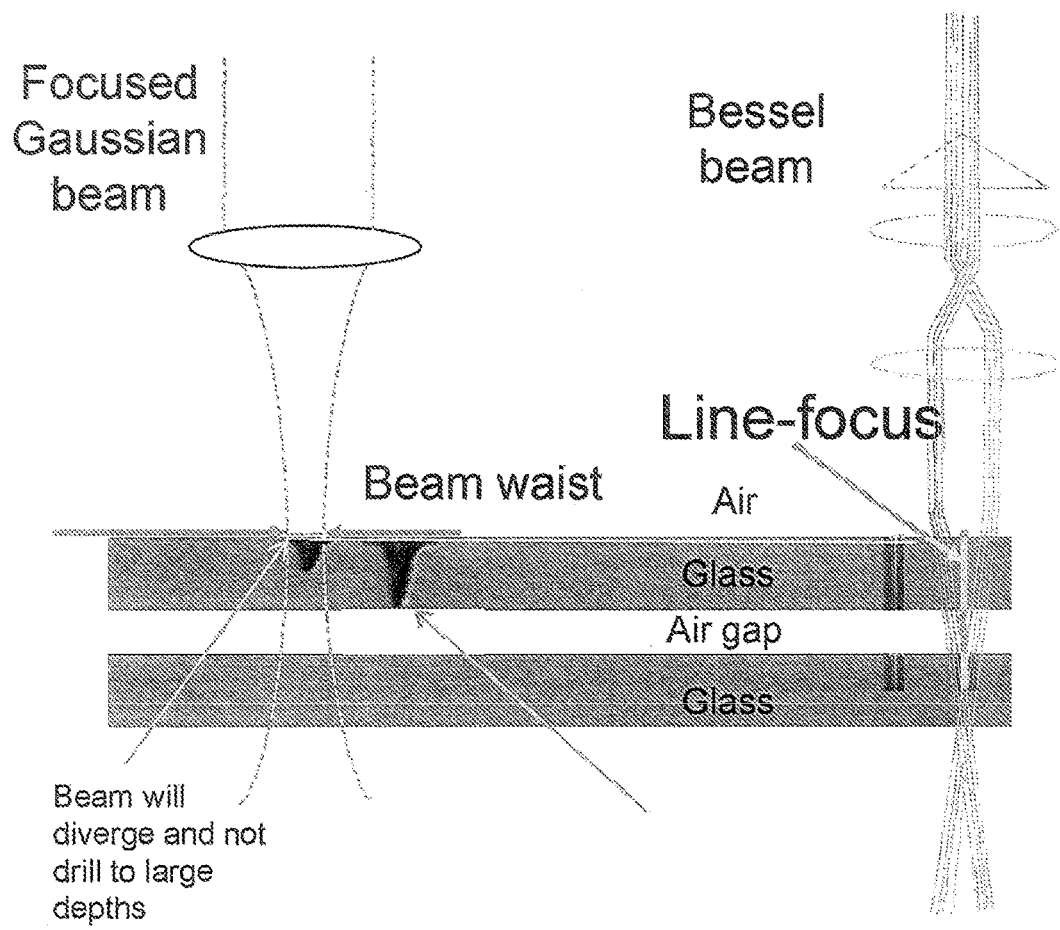
FIG. 8 is a comparison between a focused Gaussian beam and a Bessel beam incident upon a glass-air-glass composite structure.

FIG. 8 shows the contrast between a focused Gaussian beam and a Bessel beam incident upon a glass-air-glass composite structure. A focused Gaussian beam will diverge upon entering the first glass layer and will not drill to large depths, or if self-focusing occurs as the glass is drilled, the beam will emerge from the first glass layer and diffract, and will not drill into the second glass layer. In contrast, a Bessel beam will drill both glass layers over the full extent of the line focus. An example of a glass-air-glass composite structure cut with a Bessel beam is shown in the inset photograph in FIG. 8, which shows a side view of the exposed cut edges. The top and bottom glass pieces are 0.4 mm thick 2320, CT101. The exemplary air gap between two layers of glass is ~400 μm. The cut was made with a single pass of the laser at 200 mm/sec, so that the two pieces of glass were cut simultaneously, even though they were separated by >400 μm.

In some of the embodiments described herein, the air gap is between 50 μm and 5 mm, for example is between 50 μm and 2 mm, or between 200 μm and 2 mm.

Figure 9:
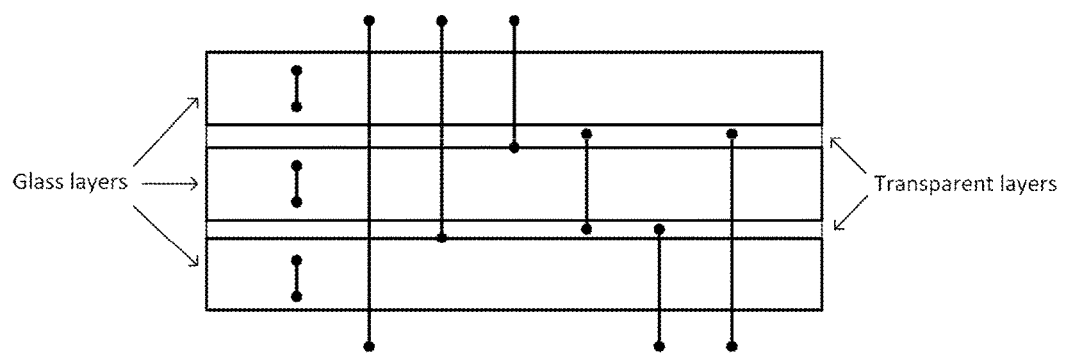
FIG. 9 is an illustration of stacking with transparent protective layers to cut multiple sheets while reducing abrasion or contamination according to an embodiment.

Exemplary disruption layers include polyethylene plastic sheeting (e.g., Visqueen). Transparent layers, as shown in FIG. 9, include transparent vinyl (e.g., Penstick). Note that unlike with other focused laser methods, to get the effect of a blocking or stop layer, the exact focus does not need to be precisely controlled, nor does the material of the disruption layer need to be particularly durable or expensive. In many applications, one just needs a layer that interferes with the laser light slightly to disrupt the laser light and prevent line focus from occurring. The fact that Visqueen prevents cutting with the picosecond laser and line focus is a perfect example—other focused picosecond laser beams will most certainly drill right through the Visqueen, and one wishing to avoid drilling right through such a material with other laser methods one would have to very precisely set the laser focus to not be near the Visqueen.

Figure 10:
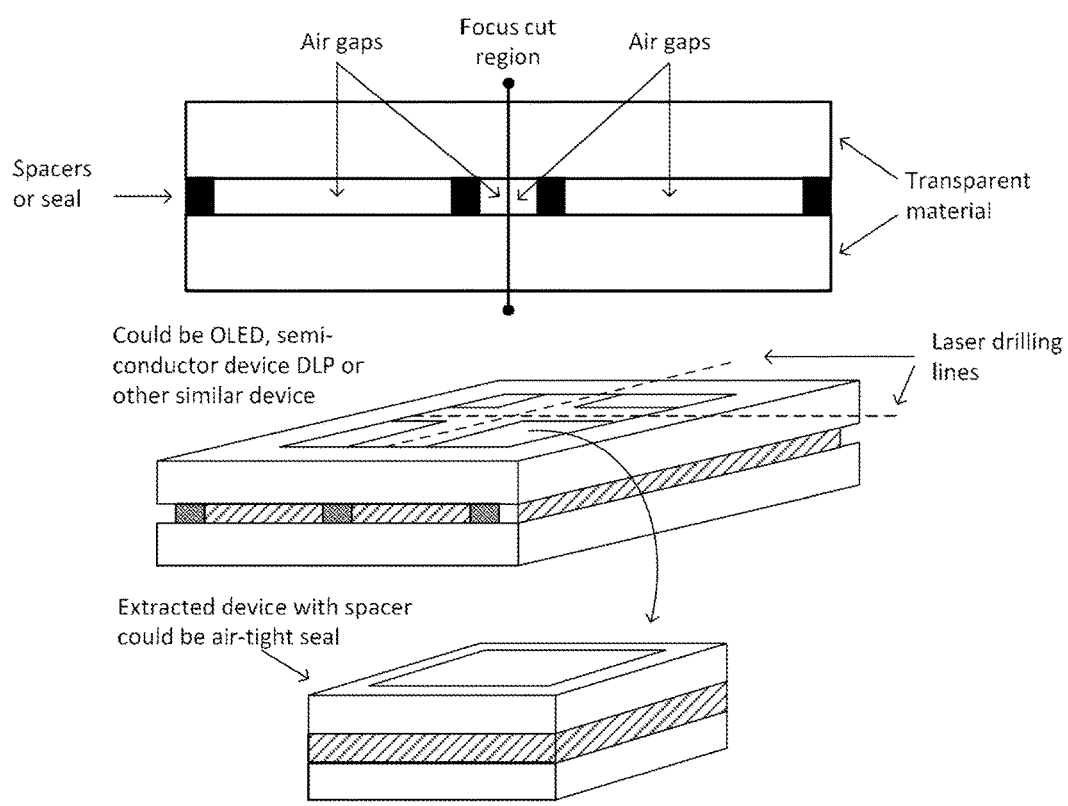
FIG. 10 is an illustration of an air gap and cutting of encapsulated devices according to an embodiment.
Figure 11:
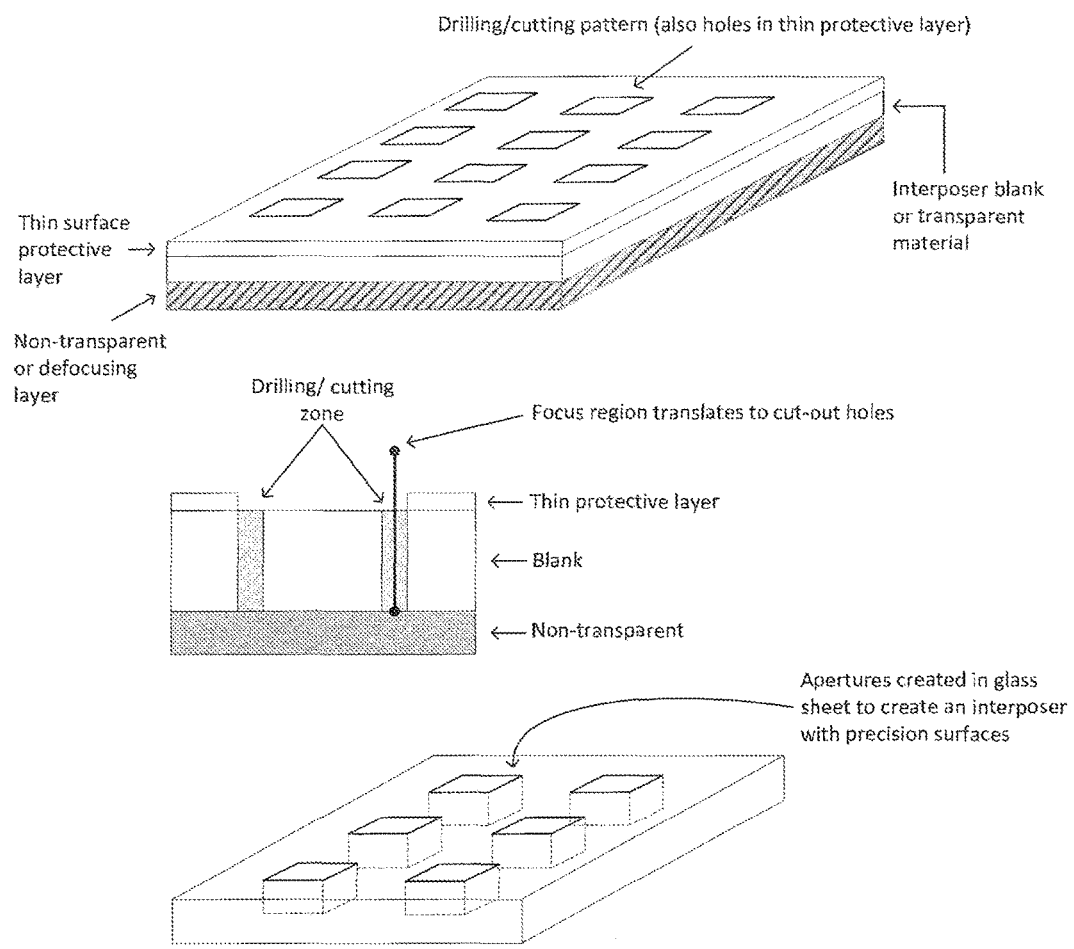
FIG. 11 is an illustration of cutting of interposers or windows with laser perforation then etch or laser perforation and $CO_2$ laser release according to an embodiment.

FIG. 10 shows stacking with transparent protective layers to cut multiple sheets while reducing abrasion or contamination. Simultaneously cutting a stack of display glass sheets is very advantageous. A transparent polymer such as vinyl can be placed between the glass sheets. The transparent polymer layers serve as protective layers serve to reduce damage to the glass surfaces which are in close contact with one another. These layers would allow the cutting process to work, but would protect the glass sheets from scratching one another, and would furthermore prevent any cutting debris (albeit it is small with this process) from contaminating the glass surfaces. The protective layers can also be comprised of evaporated dielectric layers deposited on the substrates or glass sheets, FIG. 11 shows air gap and cutting of encapsulated devices. This line focus process can simultaneously cut through stacked glass sheets, even if a significant macroscopic air gap is present. This is not possible with other laser methods, as illustrated in FIG. 8. Many devices require glass encapsulation, such as OLEDs (organic light emitting diode). Being able to cut through the two glass layers simultaneously is very advantageous for a reliable and efficient device segmentation process. Segmented means one component can be separated from a larger sheet of material that may contain a plurality of other components. Other components that can be segmented, cut out, or produced by the methods described herein are, for example, OLED (organic light emitting diode) components, DLP (digital light processor) components, an LCD (liquid crystal display) cells, semiconductor device substrates.

Figure 12:
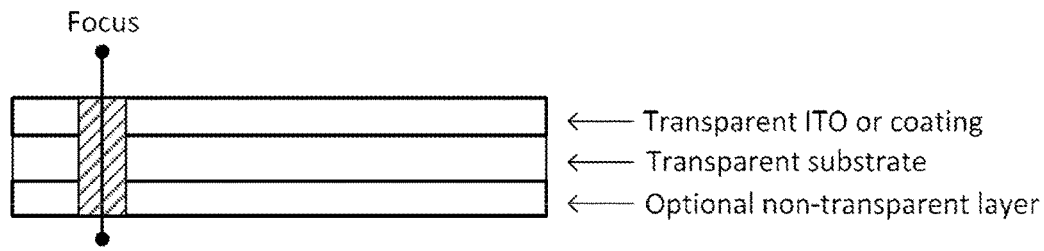
FIG. 12 is an illustration of cutting an article such as electrochromic glass coated with transparent conductive layers (e.g. indium tin oxide (ITO)) according to an embodiment.

FIG. 12 shows cutting an article such as electrochromic glass coated with transparent conductive layers (e.g. ITO). Cutting glass that already has transparent conducting layers such as indium tin oxide (ITO) is of high value for electrochromic glass applications and also touch panel devices. This laser process can cut through such layers with minimal damage to the transparent conductive layer and very little debris generation. The extremely small size of the perforated holes (<5 um) means that very little of the ITO will be affected by the cutting process, whereas other cutting methods are going to generate far more surface damage and debris.

Figure 13:
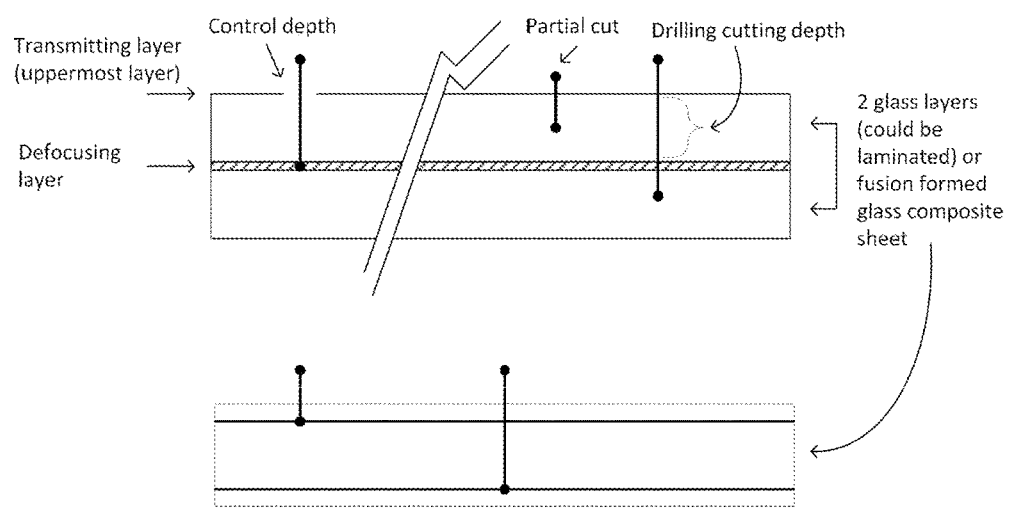
FIG. 13 is an illustration of precision cutting of some layers in a stack while not damaging others according to an embodiment.

FIG. 13 shows precision cutting of some layers in a stack while not damaging others, as also shown in FIG. 1, extending the concept to multiple layers (i.e., more than two layers). In the embodiment of FIG. 13, the disruption element is a defocusing layer.

Arresting Crack Propagation:

According to an embodiment is a method and system for arresting propagation of an incident crack through a transparent material. For example, ultrashort pulse laser beams can be focused to an energy density above a threshold needed to create a defect in the region of focus at the surface of, and/or within, the transparent material. By repeating the process as the laser and/or the transparent material are moved, a controlled series of laser-induced defects aligned along a predetermined path or pattern can be created. By spacing the laser-induced features along the predetermined pattern, the defects can used for a variety of functions. For example, as described in detail above, by spacing the defects sufficiently close together, a controlled region of mechanical weakness within the transparent material can be created and the transparent material can be precisely fractured or separated (mechanically or thermally) along the path defined by the series of laser-induced defects. For example, the ultrashort laser pulses may be optionally followed by a $CO_2$ laser or other source of thermal stress to effect fully automated separation of a transparent material or part from a substrate.

As yet another example, the predetermined pattern of laser-induced defects in the transparent material can be utilized to abate and/or arrest propagation of an incident crack in the transparent material. Often, the edge of a transparent material is the weakest point of that material, and it is subject to microcracks that form and propagate into the bulk of the material. While there are methods that attempt to deal with crack propagation, such as ion-exchange to create a compressive stress at the edge of the glass sheet, these existing methods are expensive, inefficient, and ineffective.

Accordingly, provided is an embodiment of system and method for creating a controlled series of laser-induced defects aligned along a predetermined pattern, including with a predetermined spacing, which is designed to abate and/or arrest propagation of an incident crack in the transparent material. The defects can, for example, be filled with a polymer that arrests the propagating crack, or can be shaped to create an interlocking pattern that requires a strong separation force to be applied in more than one direction in order for separation to occur. Additionally, according to yet another embodiment, the defects can be ion exchanged after they are created, which will further promote arrest of the propagating crack. If the perforating defect pattern is placed along the edge of the glass in the predetermined pattern, it can, for example, deflect a crack as it propagates into the center of the glass piece. If the crack is deflected, it could alternatively be stopped in a higher compressive stress zone.

Figure 14A:
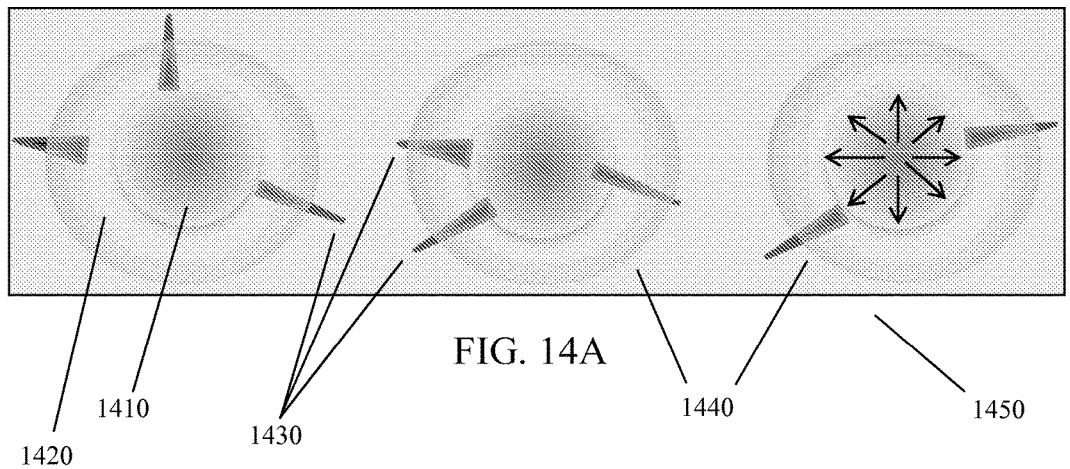
FIGS. 14A and 14B are illustrations of an top view of defects created in a material according to an embodiment.
Figure 15:
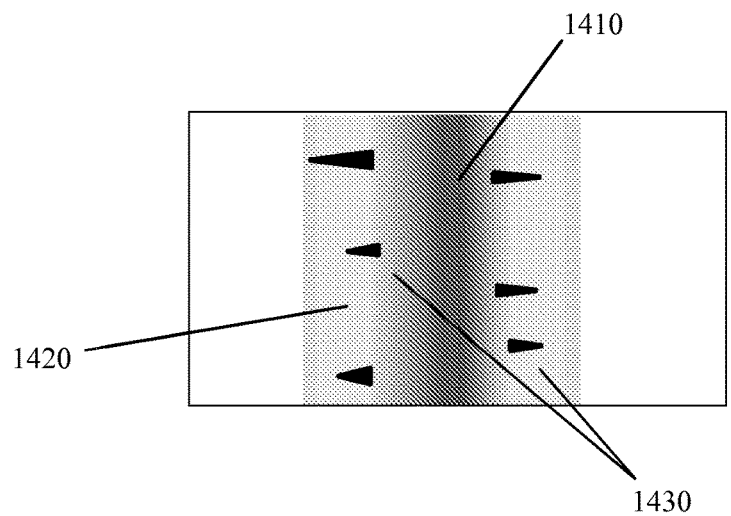
FIG. 15 is an illustration of a side view of a defect created in a material according to an embodiment.

As shown in FIG. 14A, the methods and systems described herein can be utilized to create a pattern 1450 of defects 1440. In accordance with methods described herein, the laser systems are used to create a highly controlled perforation pattern through the transparent material with very little subsurface damage and debris generation. For example, the laser is utilized to create a series of defects 1440 each with a hole 1410, also called a heat damage zone, that has a controlled location, depth, and width, among other possible variables. The defects 1440 will also have a stress field 1420 located around the hole 1410 where some energy was absorbed. Further, the majority of defects 1440 will have one or more micro cracks 1430, which do not typically propagate without the addition of some external energy or stress. Examples of micro cracks 1430 are also shown in FIG. 15.

According to an embodiment, the defect will experience a hoop stress (represented by arrows) that has both compressive and tensile components. Placing the defects 1440 at a predetermined distance from each other create a weaker interface where the propagating crack reaching each location can go to. Depending on the original crack direction and the perforated interface, the propagating incident crack will have to change its propagation angle.

Figure 14B:
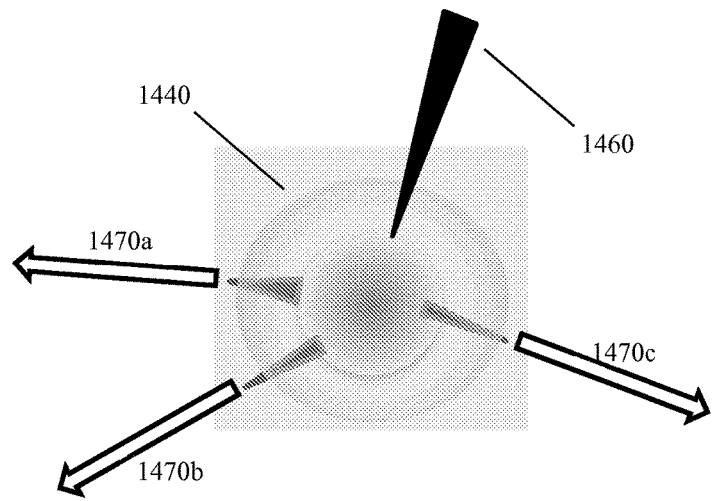

For example, as shown in FIG. 14B, incident crack 1460 is propagating through a material in which defect 1440 has previously been created. When incident crack 1460 reaches defect 1440, there are micro cracks 1430 which serve as weaker interfaces. Rather than continuing to travel in the same direction it followed before reaching the defect, incident crack 1460 can choose one of the weaker interfaces 1430 through which to continue propagating, and will change direction to one of directions 1470a, 1470b, or 1470c along the preexisting micro cracks.

According to an embodiment, the condition for crack propagation into interface can be calculated, or analyzed, using the following formula:

$$\cos^2(\theta/2) > K_{IC}/K_{ICb}$$

where $K_{IC}$ is fracture toughness for the interface, $K_{ICb}$ is fracture toughness for bulk material, and $\theta$ is the angle between the incident crack and the weaker interface plane as shown in FIG. 14B. Therefore, a higher angle between the incident crack and the weaker interface will lead to deflection of the crack. The predetermined pattern and spacing of the defects must be done such that the formula is satisfied.

The predetermined crack-abating or crack-arresting pattern is designed to generate a weak area that deflects a possible crack at a high angle, and creates an arresting point for the crack. By making a longer dissipation path for the crack, the pattern increases the amount of energy or stress required to move crack propagation forward. Thus, the incident crack will propagate along the weak interface and follow a more complicated (i.e., less straight) path, which dissipates additional energy.

Figure 16A:
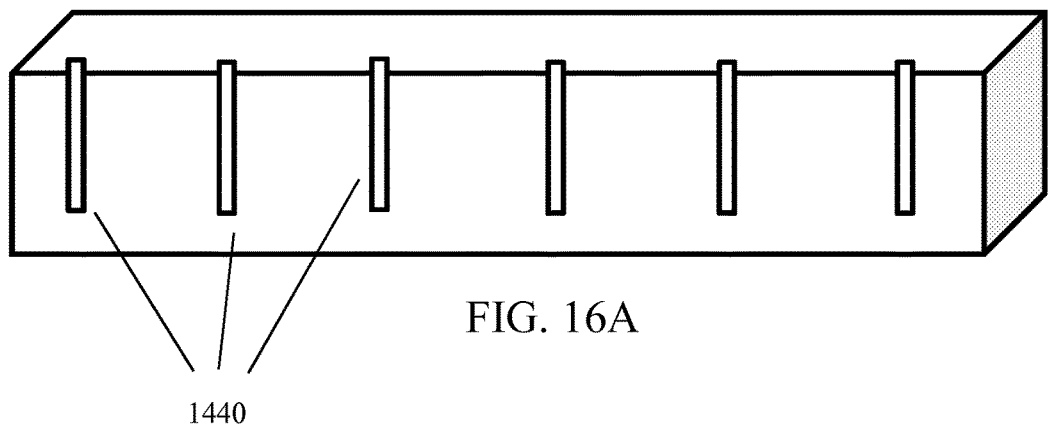
FIGS. 16A and 16B are illustrations of a side view and a top view, respectively, of a series of defects created in a material according to an embodiment.
Figure 16B:
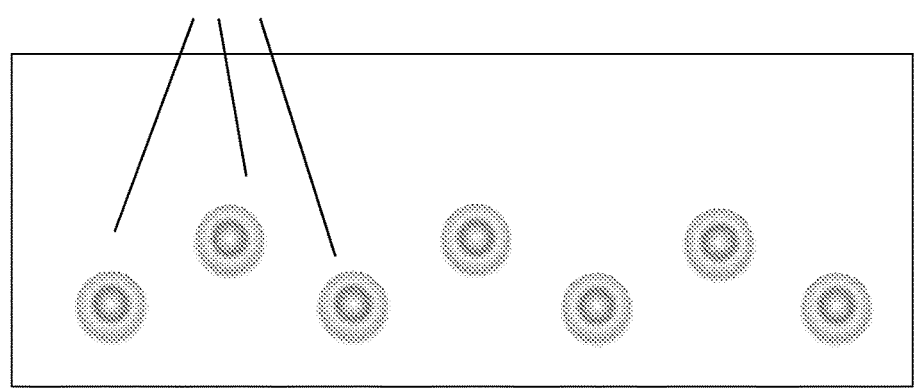
Figure 17:
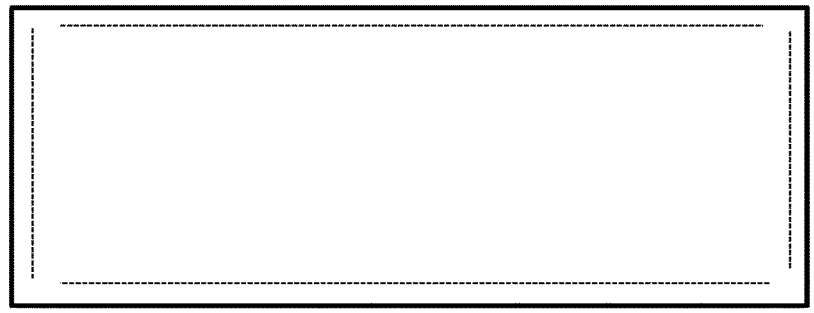
FIG. 17 is an illustration of an top view of a defect pattern created in a material according to an embodiment.

FIGS. 16A (side view) and 16B (top view) of a pattern of defects show that individual defects 1440 create a perforation plane. While the pattern is designed such that the transparent material is strong enough even with the defects that it can't be separated into multiple pieces along the perforation plane, it will still result in an incident crack being deflected if it approaches the perforation plane. Although the spacing in these figures is relatively even, the spacing can vary considerably. Further, the spacing can follow a variety of patterns, such as the relatively even and straight pattern depicted in FIG. 16A, and/or the back-and-forth pattern in FIG. 16B, among many, many other possible patterns. As shown in FIG. 17, for example, the defect pattern can be placed at a certain distance from the edge is a simple linear fashion, where the distance from the edge can be in the range of approximately 1-3 mm, among other distances. The density of the defect pattern can be dependent upon a variety of factors, including but not limited to the composition of the material, the use of the material including information about the energy or stressors that the material may be exposed to as a result of the expected use, the location and nature of the expected failure point in the material, the cost of the material and/or the cost of the pattern creation, among many others. As an example, the density may be higher at locations where incident cracks are more likely, such as the edges of the material. As another example, the cost and/or time of creating the pattern may be such that sites where incident cracks are unlikely will have a very low, or nonexistent, density of created defects.

According to one embodiment, the perforation can be created in glass capable of being ion-exchanged, where the perforation pattern is created either before the ion-exchange step or, alternatively, after the ion-exchange step. In the event where the perforation pattern is created before ion-exchange, the perforation pattern will increase the strength of the interface and, according to an embodiment, the defects may need to be placed with larger spacing. This treatment of the material can be done along the edge of the glass or in the body for higher strength applications.

In order to further strengthen the transparent material and further promote the abatement or arresting of an incident crack, the created defects can be infiltrated with a polymer, which may infiltrate the hole 1410 by capillary action. The polymer will significantly change one or more mechanical properties of the interface, and can significantly increase resistance to the crack propagation in that created weaker interface. Further, if the polymer refractive index is close to that of glass (such as, for example, 1.46-1.55), the visibility of the infiltrated defects will be significantly reduced. A variety of polymers can be used, either individually, in a combination, or in a mixture. For example, the polymer can include, but is not limited to, polyurethane, polyamide, polycarbonate, polyester, polypropylene, polyethylene, and/or polystyrene, among many others. According to one embodiment, the polymer has very low viscosity in order to infiltrate the defect passively, although active infiltration methods and systems can be utilized.

Figure 18:
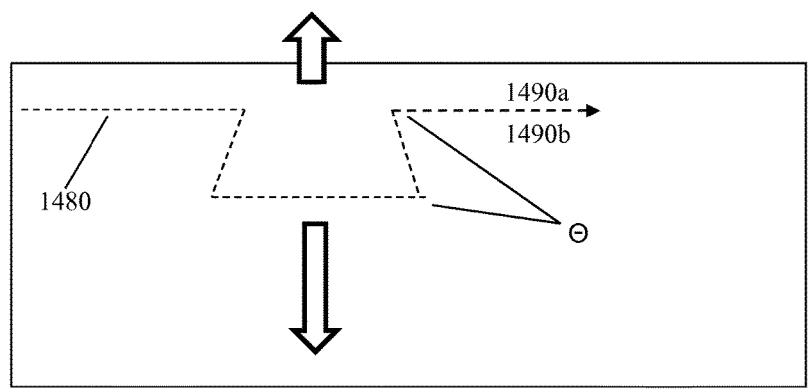
FIG. 18 is an illustration of an top view of a defect pattern created in a material according to an embodiment.

FIG. 18 is another embodiment of a crack arresting pattern, method, and system. According to this embodiment, the edge strength of the material is further strengthened by arranging the weak plane (i.e., perforation pattern) 1480 in an interlocking pattern. For example, as shown in FIG. 18, perforation pattern 1480 is arranged in a zipper-like fashion, with portion 1490a and portion 1490b on opposite sides of the predetermined perforation pattern 1480. Although the predetermined perforation pattern 1480 is designed to prevent separation of portions 1490a and 1490b and instead to defect incident cracks, a stressor or energy applied to the material may be sufficient to cause a full separation along perforation pattern 1480. Normally this would result in separation of portion 1490a from portion 1490b. However, due to the interlocking pattern, the two portions cannot be pulled directly apart in the directions of the two arrows; instead, there must be multiple directions of force applied. For example, one or both of portions 1490a and 1490b must be angled with respect to the other portion in order to allow for separation. Further, the pattern depicted in FIG. 18 also results in angles "Θ" that an incident crack could experience during propagation. These angles, according to the equation above, will help improve crack resistance. Although FIG. 18 depicts a certain interlocking shape, many other shapes are possible. For example a 'teardrop' shape would be sufficient, as would a wide variety of other shapes.

Similar to the embodiments envisioned above, the defects created for the interlocking pattern can be infiltrated with polymer to improve crack propagation resistance. In some embodiments the defects can be created on non-IOX glass, and then the defects can be ion exchanged to strengthen them. The strengthened defects then act as arresters with regard to crack propagation. In some other embodiments, the residual stresses in the region of the perforations are further manipulated (by tempering or localized heating) to influence the deflection of the crack and crack propagation arrest.

To create the interlocking predetermined perforation pattern 1480 depicted in FIG. 18, or any predetermined pattern, one or both of the laser or the material (typically held in place by a holder such as a workpiece holder) is manipulated. For example, the laser can move in relation to the material and can be activated when a certain location is reached. The laser can then move to the next location and the laser can again be activated. Alternatively, for example, the material can be moved in relation to the laser and can be activated when a certain location is reached. The material can then be moved to the next location and the laser can again be activated. A controller can control the movement of the laser and/or material and the activation of the laser, among many other functions.

Figure 19:
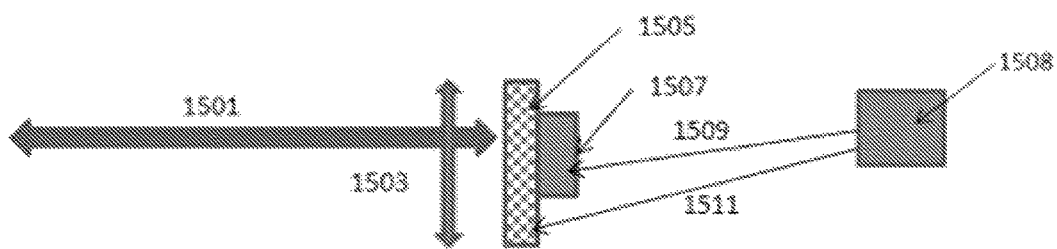
FIG. 19 is an illustration of a laser assembly according to an embodiment.

FIG. 19 shows a laser assembly attached to an optical assembly (roughly shown as a combination at 1505), to illustrate the point that these two assemblies can be attached to a moving apparatus 1507 that is configured to move the laser assembly and optical assembly 1505 with respect to the glass substrate 1400 along the x-axis 1501, the z-axis 1503, and the y-axis (which in FIG. 19 is into and out of the page). A controller 1508 can be preprogrammed to control all movements and functionalities described herein and above with respect to (and communicate with) 1511 the laser assembly and/or optical assembly 1505. The controller 1508 can also be preprogrammed to control all movements and functionalities (and communicate with) 1509 the moving apparatus 1507. Together, the control and communication programming and corresponding functionalities of the controller 1508 allows the controller 1508 to control these system components to execute instructions representing a predetermined design to create the predetermined pattern described above, as well as other designs described and envisioned herein. The transmission/transfer of data, control signals, and communication signals between the controller 1508 and the laser assembly and/or optical assembly 1505 and the moving apparatus 1507 can be implemented over a network, which can be any suitable wired or wireless network capable of transmitting communication, including but not limited to a telephone network, Internet, Intranet, local area network, Ethernet, online communication, offline communications, wireless communications and/or similar communications means. The wireless transmission can be accomplished through any wireless protocol/technology, including, but not limited to, ZigBee standards-based protocol, Bluetooth technology, and/or Wi-Fi technology. The controller 1508 can be located in the same room, in a different room in the same building, in a completely different building and location from the laser assembly and/or optical assembly 1505 and the moving apparatus 1507.

The methods and systems described and envisioned herein for arresting incident crack propagation have a wide variety of applications. As just one of many examples, the systems or methods could be utilized for defense applications to increase the strength of materials that are designed to receive an impact. The defense materials can be designed with crack arresting patterns in order to manage incident cracks that result from an impact, either directly or secondarily such as a blast wave, among other impacts. As another application, the systems or methods could be utilized for materials such as safety glass where it is desirable to manage incident cracks that result from an impact or other stress or energy source. These are just a few examples of applications where stress or energy may create a crack in a material. The systems and methods described herein could be useful for these, and other, applications.

Although the present invention has been described in connection with a preferred embodiment, it should be understood that modifications, alterations, and additions can be made to the invention without departing from the scope of the invention as defined by the claims.

What is claimed is:

1. A system for arresting propagation of an incident crack through a transparent material, the system comprising:
 a laser assembly configured to selectively provide a pulsed laser beam;
 an optical assembly coupled to the laser assembly, the optical assembly being configured to cause the pulsed laser beam to converge at a focal line, the optical assembly being adjustable such that each focal line is characterized by a dimensional parameter and disposed at a position relative to the optical assembly;
 a workpiece holder configured to hold the transparent material at a position relative to the optical assembly, the workpiece holder or the optical assembly being configured to provide a relative motion between the transparent material and the optical assembly; and
 a controller coupled to the laser assembly, the optical assembly or the workpiece holder, the controller being configured to execute instructions representing a predetermined pattern, the controller being configured to select the dimensional parameter for each pulsed laser beam, the controller being further configured to select the relative motion such that a plurality of the pulsed laser beam forms a plurality of defects corresponding to the predetermined pattern within the transparent material, each defect of the plurality of defects being substantially generated by induced absorption;
 wherein the predetermined pattern is designed to arrest an incident crack that propagates through the transparent material.

2. The system of claim 1, wherein each of the plurality of defects comprises a radial crack.

3. The system of claim 1, wherein the transparent material comprises a plurality of laminate layers.

4. The system of claim 1, wherein the dimensional parameter comprises a focal line length.

5. The system of claim 1, wherein the dimensional parameter comprises a focal line diameter.

6. The system of claim 5, wherein a length of a defect of the plurality of defects corresponds to a portion of the focal line disposed within a laminated element when the defect is substantially generated by induced absorption.

7. The system of claim 1, wherein the predetermined pattern is designed to absorb energy from the propagating incident crack.

8. The system of claim 1, wherein the incident crack comprises a propagation direction, and further wherein the predetermined pattern is designed to change the propagation direction.

9. The system of claim 1, wherein the predetermined pattern is designed to create a locking pattern, wherein the transparent material will not separate into two or more pieces if the crack propagates through the transparent material.

10. The system of claim 1, wherein one or more of the plurality of defects is at least partially filled with a polymer.

11. A method for arresting propagation of an incident crack through a transparent material, the method comprising the steps of:
   focusing each of a plurality of pulsed laser beams into a laser beam focal line directed into the transparent material, wherein each of the plurality of pulsed laser beams is directed into the transparent material at a different location, each location corresponding to a predetermined pattern;
   generating, with the laser beam focal line, an induced absorption within the transparent material, the induced absorption producing a defect in the transparent material;
   wherein the predetermined pattern is designed to arrest an incident crack that propagates through the transparent material.

12. The method of claim 11, wherein each of the plurality of defects comprises a radial crack.

13. The method of claim 11, wherein the predetermined pattern is designed to absorb energy from the propagating incident crack.

14. The method of claim 11, wherein the incident crack comprises a propagation direction, and further wherein the predetermined pattern is designed to change the propagation direction.

15. The method of claim 11, wherein the predetermined pattern is designed to create a locking pattern, wherein the transparent material will not separate into two or more pieces if the crack propagates through the transparent material.

16. The method of claim 11, further comprising the step of:
   determining said predetermined pattern based on a characteristic of the transparent material.

17. The method of claim 16, wherein the characteristic is a likelihood of a crack propagating through the transparent material.

18. The method of claim 16, wherein the characteristic is the composition of the transparent material.

19. The method of claim 11, further comprising the step of:
   filling, at least partially, the defect with a polymer.

20. The method of claim 11, further comprising the step of:
   providing an assembly, the laser beam assembly comprising: (i) a laser assembly configured to selectively provide a pulsed laser beam; (ii) an optical assembly configured to cause the pulsed laser beam to converge at a focal line; (iii) a transparent material holder configured to hold the transparent material at a position relative to the optical assembly, the transparent material holder or the optical assembly being configured to provide a relative motion between the transparent material and the optical assembly; and (iv) a controller configured to execute instructions representing the predetermined pattern, and further configured to select the relative motion such that a plurality of the pulsed laser beam forms a plurality of defects corresponding to the predetermined pattern within the transparent material.

* * * * *

UNITED STATES PATENT AND TRADEMARK OFFICE
CERTIFICATE OF CORRECTION

PATENT NO. : 10,335,902 B2
APPLICATION NO. : 15/325893
DATED : July 2, 2019
INVENTOR(S) : Dana Craig Bookbinder et al.

Page 1 of 1

It is certified that error appears in the above-identified patent and that said Letters Patent is hereby corrected as shown below:

On the Title Page

On page 5, Column 2, item (56), other publications, Line 11, delete "Proccessing" and insert -- Processing --, therefor.

On page 6, Column 1, item (56), other publications, Line 40, delete "pluse" and insert -- pulse --, therefor.

On page 6, Column 1, item (56), other publications, Line 63, delete "micro-achitecture," and insert -- micro-architecture, --, therefor.

On page 6, Column 2, item (56), other publications, Line 28, delete "Egineering" and insert -- Engineering --, therefor.

On page 7, Column 1, item (56), other publications, Line 13, delete "TheAnti-glare" and insert -- The Anti-glare --, therefor.

On page 8, Column 2, item (56), other publications, Lines 38-39, delete "Eelectropolishing;" and insert -- Electropolishing; --, therefor.

Signed and Sealed this
Third Day of March, 2020

Andrei Iancu
*Director of the United States Patent and Trademark Office*